(12) United States Patent
Alu et al.

(10) Patent No.: US 9,880,403 B2
(45) Date of Patent: Jan. 30, 2018

(54) MAGNETIC-FREE NON-RECIPROCAL DEVICES EXHIBITING NON-RECIPROCITY THROUGH ANGULAR MOMENTUM BIASING

(71) Applicant: Board of Regents, The University of Texas System, Austin, TX (US)

(72) Inventors: Andrea Alu, Austin, TX (US);
Dimitrios Sounas, Austin, TX (US);
Nicholas Estep, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/192,607

(22) Filed: Jun. 24, 2016

(65) Prior Publication Data
US 2017/0212367 A1 Jul. 27, 2017

Related U.S. Application Data

(63) Continuation of application No. 14/296,874, filed on Jun. 5, 2014, now Pat. No. 9,405,136.
(Continued)

(51) Int. Cl.
*G02F 1/035* (2006.01)
*G02F 1/01* (2006.01)
*G02B 26/08* (2006.01)

(52) U.S. Cl.
CPC ........... *G02F 1/0128* (2013.01); *G02B 26/08* (2013.01); *G02F 1/011* (2013.01); *G02F 1/0121* (2013.01); *G02F 2202/30* (2013.01); *G02F 2203/15* (2013.01)

(58) Field of Classification Search
CPC .................................................. G02F 1/0955
See application file for complete search history.

(56) References Cited

U.S. PATENT DOCUMENTS

| | | | |
|---|---|---|---|
| 6,633,161 B1* | 10/2003 | Vaughan, Jr. | .... G01R 33/34046 324/318 |
| 2009/0290835 A1* | 11/2009 | Popovic | ............. G02B 6/12007 385/32 |

(Continued)

FOREIGN PATENT DOCUMENTS

WO 2012083441 A1 6/2012

OTHER PUBLICATIONS

Sounas et al., "Non-Reciprocal Metamaterials with Angular Momentum Biasing," USNC-URSI National Radio Science Meeting, Lake Buena Vista, Flordia, Jul. 7-12, 2013, p. 1.

(Continued)

*Primary Examiner* — Sung Pak
*Assistant Examiner* — Hoang Tran
(74) *Attorney, Agent, or Firm* — Robert A. Voigt, Jr.; Winstead, P.C.

(57) ABSTRACT

A non-reciprocal device incorporating metamaterials which exhibit non-reciprocity through angular momentum biasing. The metamaterial, such as a ring resonator, is angular-momentum biased. This is achieved by applying a suitable mechanical or spatio-temporal modulation to resonant inclusions of the metamaterial, thereby producing strong non-reciprocity. In this manner, non-reciprocity can be produced without requiring the use of large and bulky magnets to produce a static magnetic field. The metamaterials of the present invention can be realized by semiconducting and/or metallic materials which are widely used in integrated circuit technology, and therefore, contrary to magneto-optical materials, can be easily integrated into the non-reciprocal devices and large microwave or optical systems. The metamaterials of the present invention can be compact at various frequencies due to the enhanced wave-matter interaction in the constituent resonant inclusions. Additionally, by using the metamaterials of the present invention, the power consumed in the biasing network is drastically reduced.

14 Claims, 17 Drawing Sheets

Related U.S. Application Data

(60) Provisional application No. 61/857,580, filed on Jul. 23, 2013.

(56) References Cited

U.S. PATENT DOCUMENTS

| | | | | |
|---|---|---|---|---|
| 2010/0117891 | A1* | 5/2010 | Utagawa | G01S 7/03 342/175 |
| 2010/0238536 | A1* | 9/2010 | Hu | G02B 6/12007 359/280 |

OTHER PUBLICATIONS

Sounas et al., "Giant Non-Reciprocity at the Subwavelength Scale Using Angular Momentum-Biased Metamaterials," Nature Communications, vol. 4, No. 2407, Sep. 2, 2013, pp. 1-7.

Kodera et al., "Artificial Faraday Rotation Using a Ring Metamaterial Structure Without Static Magnetic Field," Applied Physics Letters, vol. 99, No. 031114, Jul. 20, 2011, pp. 1-3.

Yu et al., "Complete Optical Isolation Created by Indirect Interband Photonic Transitions," Nature Photonics, vol. 3, Jan. 11, 2009, pp. 91-94.

Sounas et al., "Angular-Momentum Biased Nanorings to Realize Magnetic-Free Integrated Optical Isolation," ACS Photonics, vol. 1, Issue 3, Jan. 17, 2014, pp. 198-204.

Estep et al., "Angular-Momentum-Biasing for Non-Reciprocal Electromagnetic Devices," 2014 Texas Symposium on Wireless and Microwave Circuits and Systems, Baylor University, Apr. 3-4, 2014, pp. 1-4.

\* cited by examiner

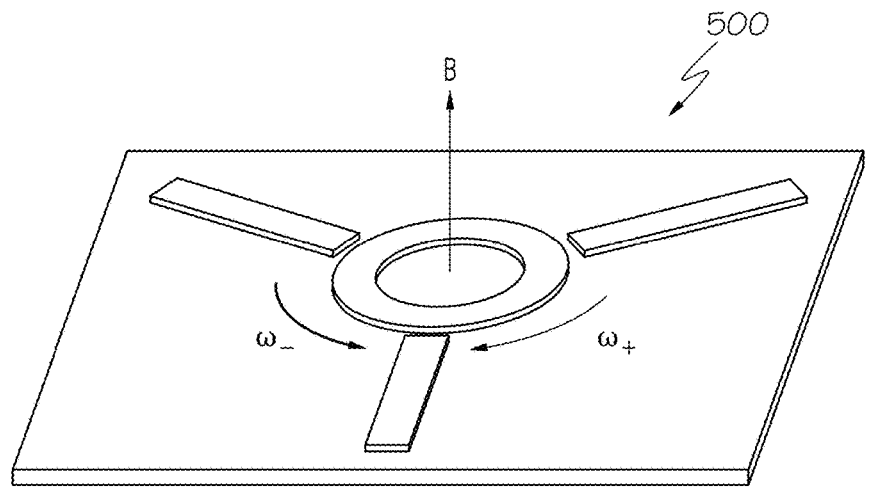
FIG. 5A
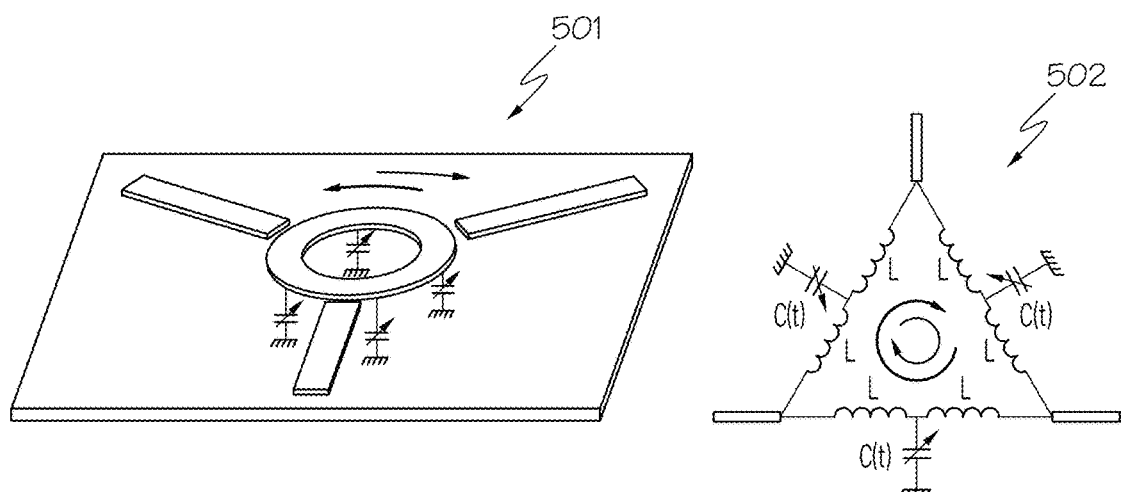
FIG. 5B(1)
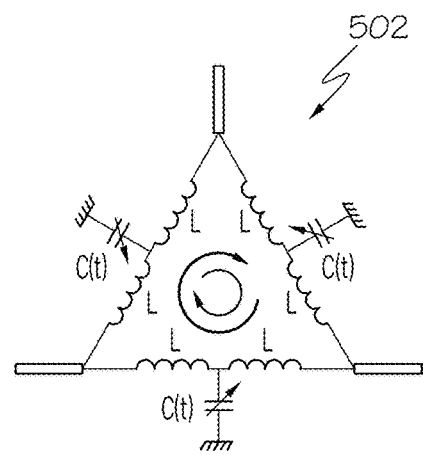
FIG. 5B(2)

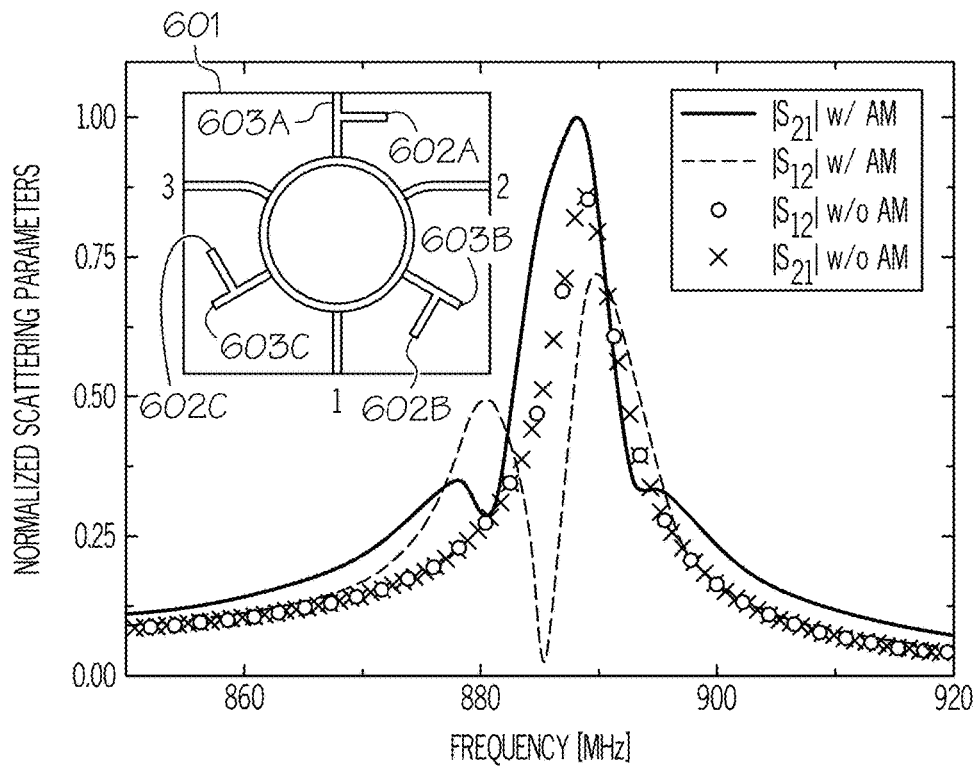
FIG. 6
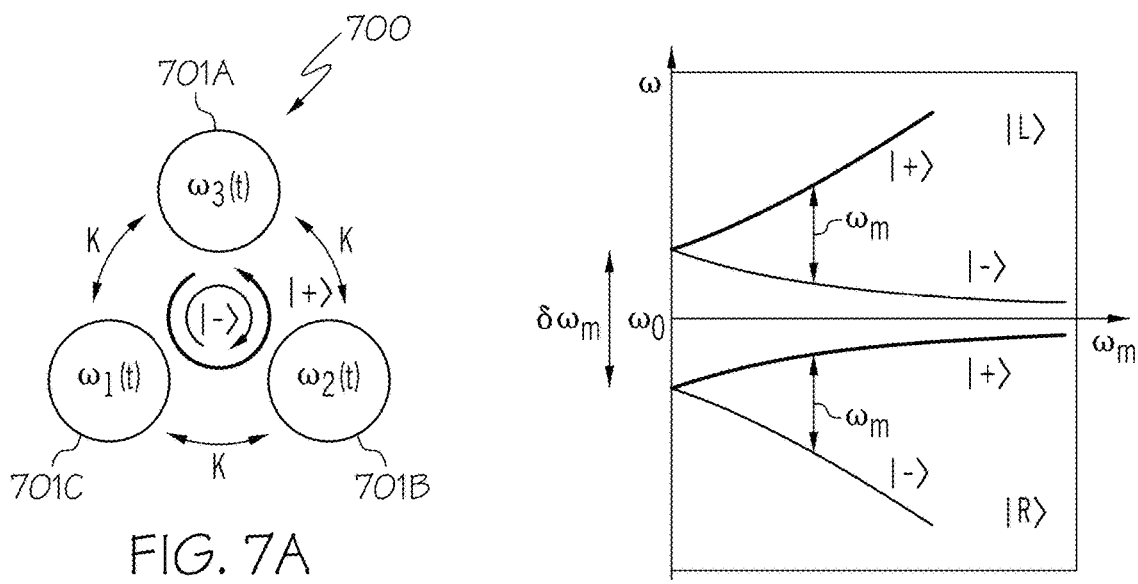
FIG. 7A
FIG. 7B

1000

| COMPONENT | VALUE | QUALITY FACTOR | SELF-RESONANT FREQUENCY | EQUIVALENT SERIES RESISTANCE (ESR) (Ω) |
|---|---|---|---|---|
| $C_1$ | 300 pF | 50 | 650 MHz | 0.04 |
| $C_2$ (SKYWORKS SMV 1237) | 30 pF @ $V_{dc}$ = 3V | - | - | 0.25 |
| $L_1$ | 270 nH | 30 | 14 MHz | 0.8 |
| $L_2$ | 27 nH | 55 | 200 MHz | 0.57 |
| $C_c$ | 5.6 pF | >1000 | 7 GHz | 0.05 |
| $L_c$ | 1 uH | - | - | 3.8 |
| $C_{dcb}$ | 10 uF | - | - | - |
| $L_{rfc}$ | 2.7 uH | - | - | - |

FIG. 10

| EQUIPMENT | MODEL |
|---|---|
| VECTOR NETWORK ANALYZER | AGILENT E5071C ENA SERIES |
| SIGNAL GENERATOR | HP 33120A |
| POWER SUPPLY | AGILENT E3631A |
| DIPLEXER | MINI-CIRCUITS ZDPLX-2150-S+ |
| POWER DIVIDER | ANZAC DS-4-4 |

MAGNETIC-FREE NON-RECIPROCAL DEVICES EXHIBITING NON-RECIPROCITY THROUGH ANGULAR MOMENTUM BIASING

GOVERNMENT INTERESTS

This invention was made with government support under Grant No. HDTRA1-12-1-0022 awarded by the Defense Threat Reduction Agency and Grant No. FA9550-11-1-0009 awarded by the Air Force Office of Scientific Research Young Investigator Research. The U.S. government has certain rights in the invention.

TECHNICAL FIELD

The present invention relates generally to non-reciprocal devices, and more particularly to magnetic-free non-reciprocal devices exhibiting non-reciprocity through angular momentum biasing.

BACKGROUND

Non-reciprocal devices, such as isolators, circulators and phase shifters, are important in electrical systems, such as communication networks, to prevent adverse backward reflection, interference and feedback. Traditionally, non-reciprocity in microwaves and optics is achieved by using magneto-optical materials, where non-reciprocity is the result of biasing with a static magnetic field. By requiring the use of a static magnetic field, heavy and bulky magnets are required which are difficult to integrate in the non-reciprocal devices. As a result, different biasing schemes have been devised in an attempt to eliminate the use of heavy and bulky magnets.

One such scheme involves the use of metamaterials based on transistor-loaded ring resonators that are biased via direct current. Unfortunately, such a scheme involves significant power consumption (power consumption in the biasing network and the transistor itself) and its operation is limited to microwave frequencies.

Another scheme involves the use of optical isolators consisting of spatially-temporarily modulated waveguides that are biased via linear momentum. Unfortunately, such a scheme is limited to specific applications where the spatially-temporarily modulated waveguides need to be many wavelengths long. Furthermore, such a scheme also involves significant power consumption in the biasing network.

SUMMARY

In one embodiment of the present invention, a non-reciprocal device comprises one or more resonators, where an angular momentum in the form of mechanical motion, rotation or spatio-temporal modulation is applied to the one or more resonators thereby producing non-reciprocity without magnets.

In another embodiment of the present invention, a non-reciprocal device comprises a substrate and an angular-momentum biased ring resonator on the substrate, where the ring resonator is permittivity modulated.

In a further embodiment of the present invention, a non-reciprocal device comprises a ring of one or more components coupled together, where each of the one or more components is modulated in time and operable at either microwave, light or sound waves.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5A illustrates a magnetically biased three-port junction, resulting in a non-reciprocal scattering response in accordance with an embodiment of the present invention;

FIGS. 5B(1)-5B(2) illustrate an angular-momentum-biased ring circulator and spatiotemporally-modulated lumped circuit circulator in accordance with an embodiment of the present invention;

FIG. 6 is a graph of the simulated results for the magnitude of the transmission coefficients in a microstrip resonator designed following the same principle as in FIG. 9 in accordance with an embodiment of the present invention;

FIG. 7A illustrates a ring structure consisting of three strongly coupled identical and symmetrically-coupled resonant tanks with resonance frequency $\omega_0$ and coupling factor $\kappa$ in accordance with an embodiment of the present invention;

FIG. 7B is a frequency diagram of the hybrid states $|R\rangle$ and $|L\rangle$ of the modulated ring versus $\omega_m$ in accordance with an embodiment of the present invention;

FIG. 10 is a table of the values of the lumped elements used in the fabricated layout in accordance with an embodiment of the present invention;

DETAILED DESCRIPTION

As stated in the Background section, non-reciprocal devices, such as isolators, circulators and phase shifters, are important in electrical systems, such as communication networks, to prevent adverse backward reflection, interference and feedback. Traditionally, non-reciprocity in microwaves and optics is achieved via magneto-optical materials, where non-reciprocity is the result of biasing with a static magnetic field. By requiring the use of a static magnetic field, heavy and bulky magnets are required which are difficult to integrate in the non-reciprocal devices. As a result, different biasing schemes have been devised in an attempt to eliminate the use of heavy and bulky magnets. One such scheme involves the use of metamaterials based on transistor-loaded ring resonators that are biased via direct current. Unfortunately, such a scheme involves significant power consumption (power consumption in the biasing network) whose operation is limited to microwave frequencies. Another scheme involves the use of optical isolators consisting of spatially-temporarily modulated waveguides that are biased via linear momentum. Unfortunately, such a scheme is limited to specific applications where the spatially-temporarily modulated waveguides need to be many wavelengths long. Furthermore, such a scheme also involves significant power consumption for the biasing network.

Figure 1A:
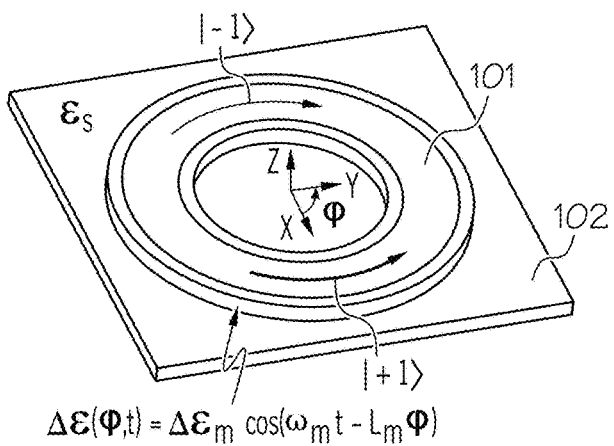
FIG. 1A illustrates the geometry of an azimuthally symmetric ring resonator with spatio-temporal (ST) modulated permittivity in accordance with an embodiment of the present invention.
Figure 1B:
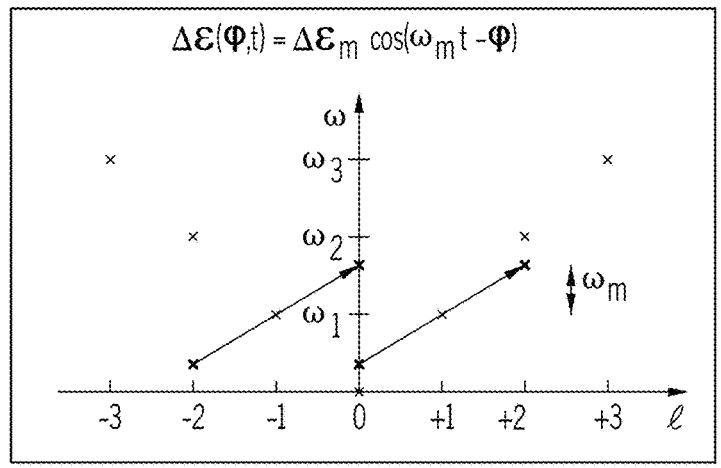
FIGS. 1B and 1C are graphs illustrating the transformation of the states with angular momentum ±1 in the frequency/angular momentum plane for the modulation orbital angular momentum being 1 and 2, respectively, in accordance with an embodiment of the present invention.
Figure 1C:
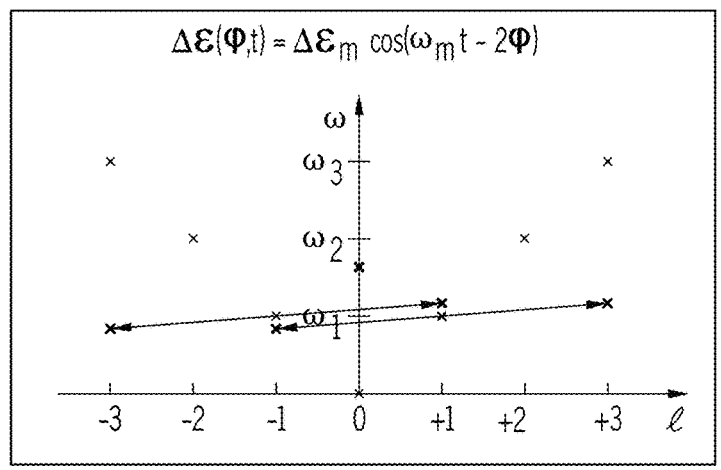
Figure 1D:
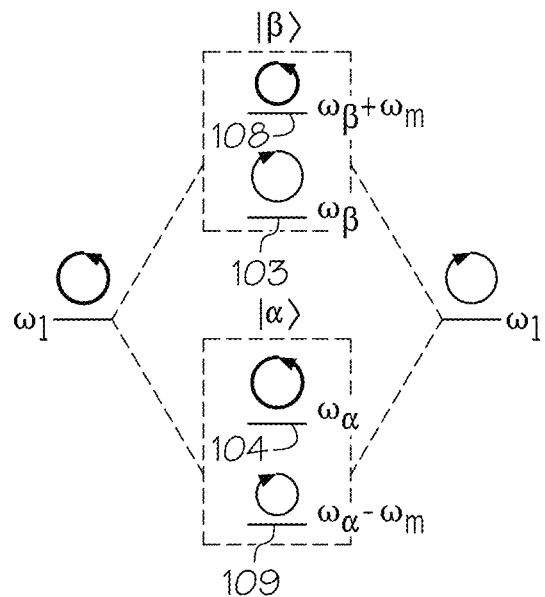
FIG. 1D is a frequency diagram of the eigen-states of the ring resonator of FIG. 1A without and with spatio-temporal modulation for the modulation orbital angular momentum being 2 in accordance with an embodiment of the present invention.
Figure 1E:
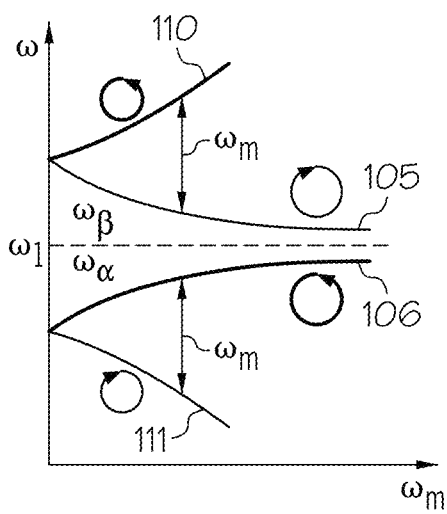
FIG. 1E is a graph illustrating the substate eigen-frequencies versus the modulation frequency for the modulation orbital angular momentum ($L_m$) being 2 in accordance with an embodiment of the present invention.
Figure 1F:
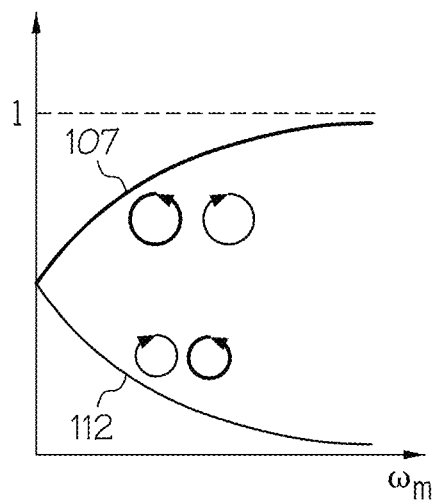
FIG. 1F is a graph illustrating the substate energies versus the modulation frequency for $L_m=2$ in accordance with an embodiment of the present invention.
Figure 2A:
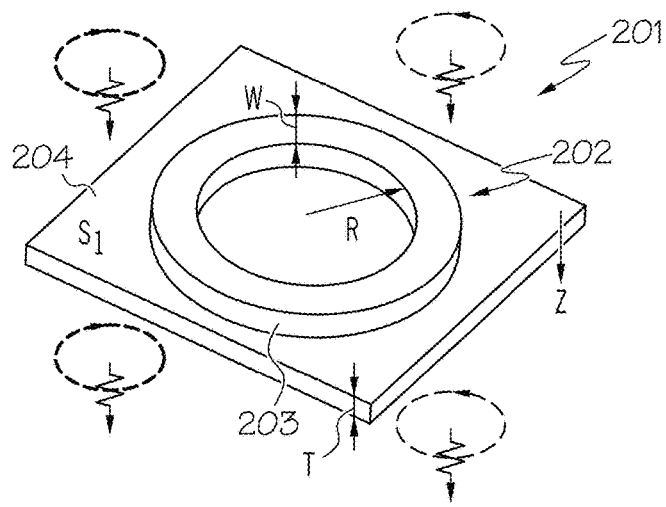
FIG. 2A illustrates a spatio-temporal (ST) modulated metasurface consisting of periodically arranged pairs of broadside-parallel metallic rings patterned on both sides of a thin dielectric layer in accordance with an embodiment of the present invention.
Figure 2B:
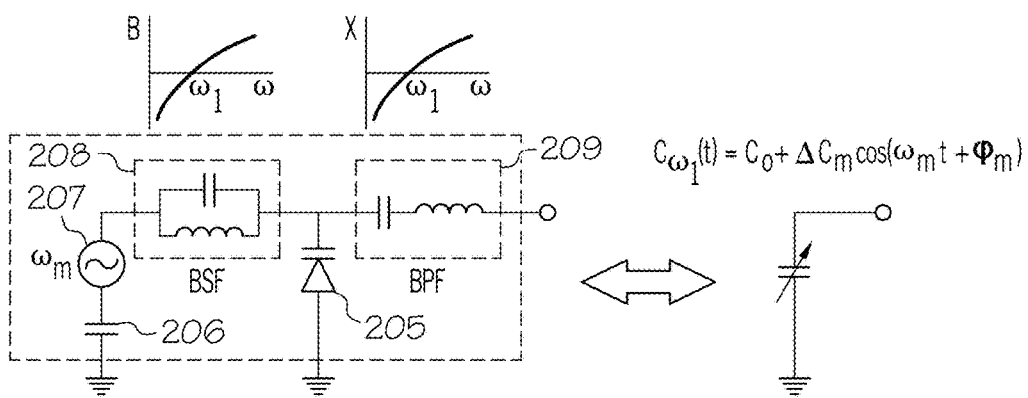
FIG. 2B illustrates an implementation of capacitance modulation in accordance with an embodiment of the present invention.
Figure 2C:
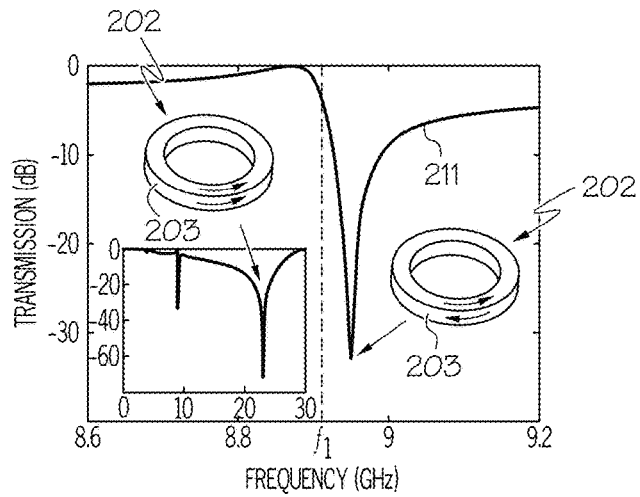
FIG. 2C is a graph illustrating the transmission through the unmodulated metasurface in accordance with an embodiment of the present invention.
Figure 2D:
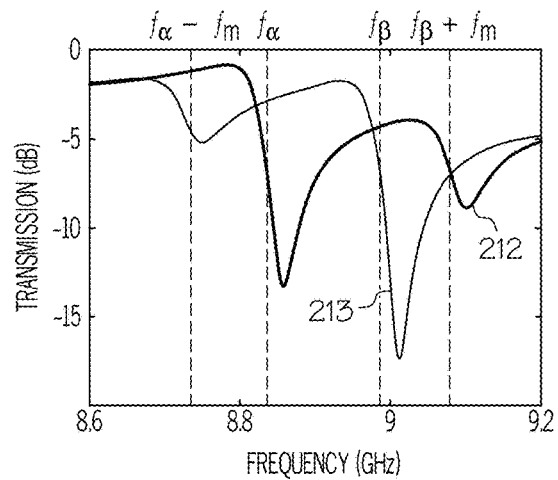
FIG. 2D is a graph illustrating transmission in the +z direction with a capacitance modulation of 0.02 pF and a modulation frequency of 0.1 GHz in accordance with an embodiment of the present invention.
Figure 2E:
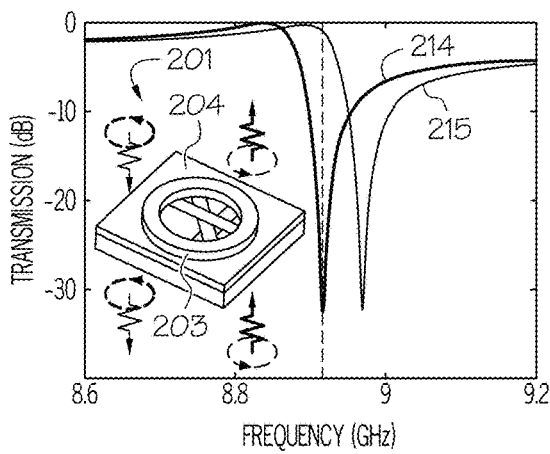
FIG. 2E is a graph illustrating transmission in the +z direction with a capacitance modulation of 0.02 pF and a modulation frequency of 0.5 GHz in accordance with an embodiment of the present invention.
Figure 3A:
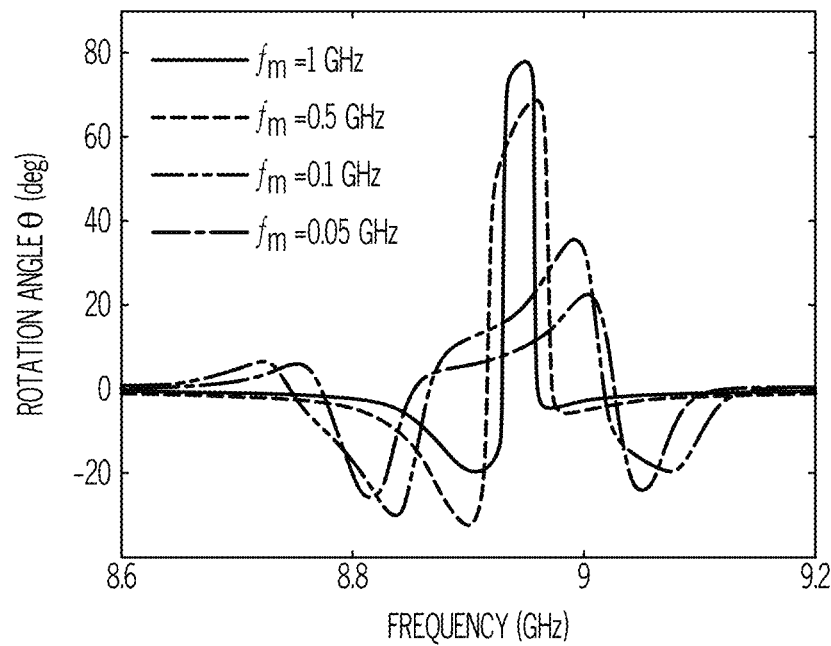
FIG. 3A is a graph illustrating the polarization rotation angle for different modulation frequencies and a capacitance modulation of 0.02 pF in accordance with an embodiment of the present invention.
Figure 3B:
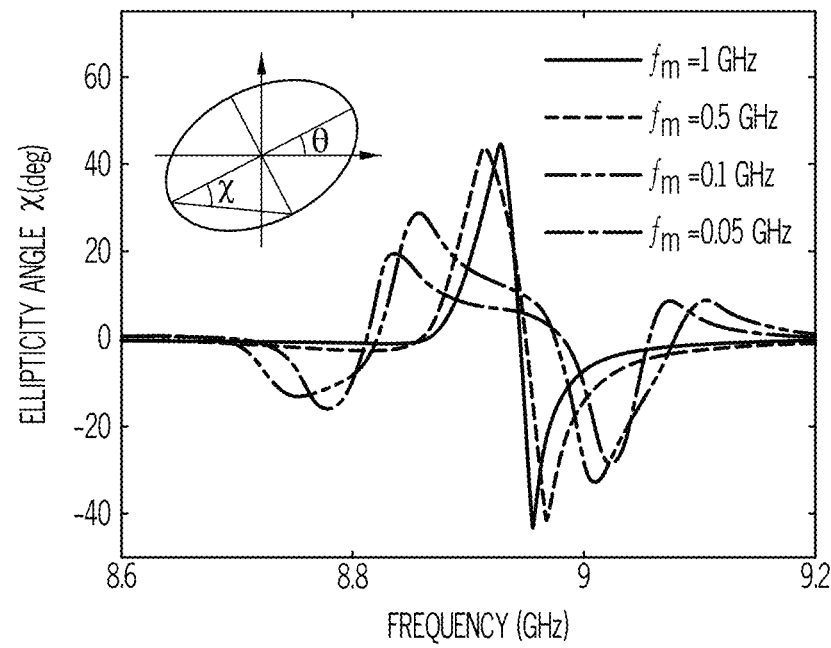
FIG. 3B is a graph illustrating the corresponding ellipticity angle for different modulation frequencies and a capacitance modulation of 0.02 pF in accordance with an embodiment of the present invention.
Figure 4A:
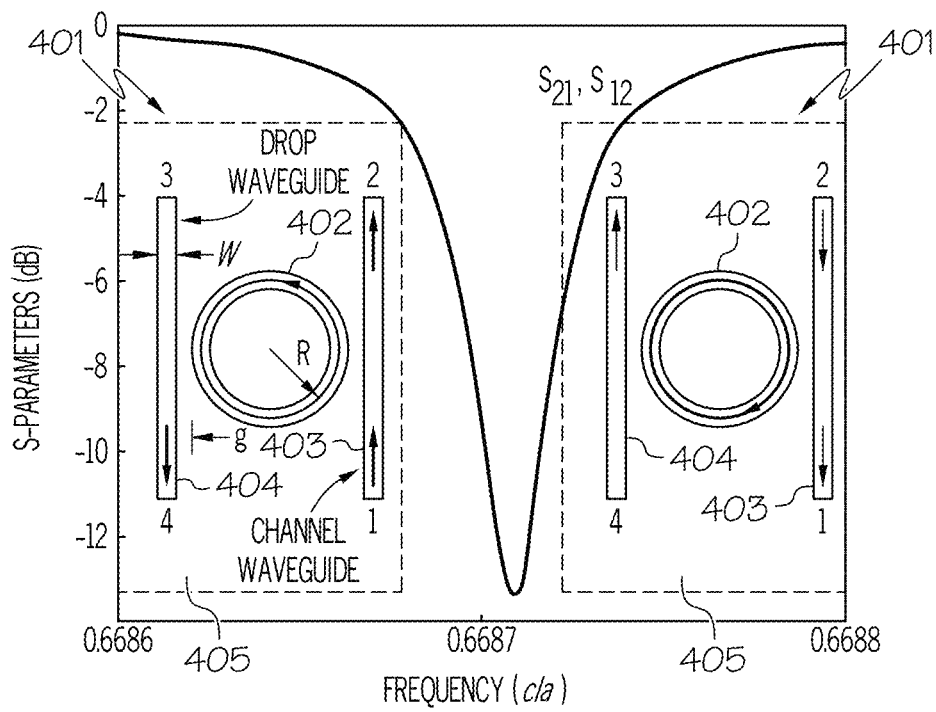
FIG. 4A is a graph illustrating transmission versus frequency for an optical channel-drop filter in accordance with an embodiment of the present invention.
Figure 4B:
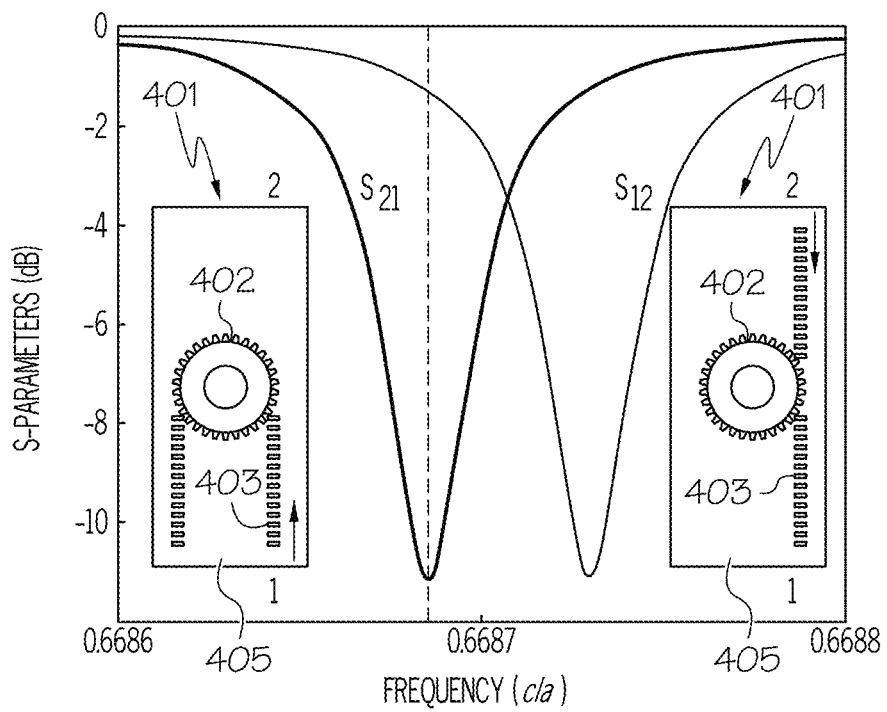
FIG. 4B is a graph illustrating non-reciprocal transmission versus frequency for the optical channel-drop filter under spatiotemporal modulation in accordance with an embodiment of the present invention.

The principles of the present invention provide a means for overcoming these deficiencies by developing a novel class of metamaterials that exhibit non-reciprocity through angular momentum biasing. The constituent element of these metamaterials is an azimuthally spatially and temporally modulated ring resonator. As a result, non-reciprocity can be produced with a low frequency electrical signal in contrast to magneto-optical materials requiring the use of large and bulky magnets to produce a static magnetic field. Furthermore, the metamaterials of the present invention can be realized by semiconducting and/or metallic materials, such as silicon and gold, which are widely used in integrated circuit technology, and therefore, contrary to magneto-optical materials, can be easily integrated into the non-reciprocal devices. Additionally, the metamaterials of the present invention can be compact at various frequencies (e.g., microwave, optical) due to the enhanced light-matter interaction in the constituent resonant inclusions. In contrast, magneto-optical devices can be bulky at optical frequencies due to the weak magneto-optical effect at these frequencies. In addition, the metamaterials of the present invention can be implemented at a wide range of frequencies, such as from microwave to light, in contrast to transistor-based metamaterials whose operation is limited to microwave frequencies. Furthermore, the metamaterials of the present invention can be more compact due to the enhanced light-matter interaction of their resonant inclusions (elements) as opposed to spatially-temporarily modulated waveguides which need to be many wavelengths long. Additionally, by using the metamaterials of the present invention, the power consumed in the biasing network is drastically reduced. A discussion of non-reciprocal devices implementing metamaterials exhibiting non-reciprocity through angular momentum biasing is provided below in connection with FIGS. 1A-1F, 2A-2E, 3A-3B and 4A-4B. FIG. 1A illustrates the geometry of an azimuthally symmetric ring resonator with spatio-temporal (ST) modulated permittivity. FIGS. 1B and 1C are graphs illustrating the transformation of the states with angular momentum ±1 in the frequency/angular momentum plane for the modulation orbital angular momentum being 1 and 2, respectively. FIG. 1D is a frequency diagram of the eigen-states of the ring resonator of FIG. 1A without and with spatio-temporal modulation for the modulation orbital angular momentum being 2. FIG. 1E is a graph illustrating the substate eigen-frequencies versus the modulation frequency for the modulation orbital angular momentum ($L_m$) being 2. FIG. 1F is a graph illustrating the substate energies versus the modulation frequency for $L_m=2$. FIG. 2A illustrates a spatio-temporal (ST) modulated metasurface consisting of periodically arranged pairs of broadside-parallel metallic rings patterned on both sides of a thin dielectric layer. FIG. 2B illustrates an implementation of capacitance modulation. FIG. 2C is a graph illustrating the transmission through the unmodulated metasurface. FIG. 2D is a graph illustrating transmission in the +z direction with a capacitance modulation of 0.02 pF and a modulation frequency of 0.1 GHz. FIG. 2E is a graph illustrating transmission in the +z direction with a capacitance modulation of 0.02 pF and a modulation frequency of 0.5 GHz. FIG. 3A is a graph illustrating the polarization rotation angle for different modulation frequencies and a capacitance modulation of 0.02 pF. FIG. 3B is a graph illustrating the corresponding ellipticity angle for different modulation frequencies and a capacitance modulation of 0.02 pF. FIG. 4A is a graph illustrating transmission versus frequency for an optical channel-drop filter. FIG. 4B is a graph illustrating non-reciprocal transmission versus frequency for the optical channel-drop filter under spatiotemporal modulation.

Referring now to the Figures in detail, a possible constituent inclusion (element) of the metamaterial of the present invention is a simple ring resonator 101 (may also be a collection of ring resonators) on a substrate 102 loaded with a spatio-temporal (ST) azimuthally modulated permittivity as schematically shown in FIG. 1A in accordance with an embodiment of the present invention, where $\varphi$ is the azimuthal coordinate in a cylindrical reference system co-centered with the inclusion and $L_m$ is the modulation orbital angular momentum. In absence of modulation, $\Delta\epsilon_m=0$, ring 101 supports degenerate counter-propagating states $|\pm 1\rangle e^{-i\omega_1 t}$ with azimuthal dependence $e^{\pm i l\varphi}$, resonating when the ring circumference is 1 times the guided wavelength, which implies that, for the fundamental $|\pm 1\rangle$ states used herein, the ring dimensions are smaller than the wavelength. The resonant size can be further reduced by adding capacitances along the loop, as in split-ring resonator design. As will be shown shortly, introducing suitable ST azimuthal modulation can lift the degeneracy between the $|\pm 1\rangle$ states and produce non-reciprocity, an effect that can be interpreted as the metamaterial analog of a static magnetic bias removing the degeneracy between atomic states of opposite orbital angular momenta in magnetic materials.

The proposed permittivity modulation is a type of amplitude modulation, and, as such, it results in the generation of two intermodulation products $|k+L_m\rangle e^{-i(\omega_k+\omega_m)t}$ and $|k-L_m\rangle e^{-i(\omega_k-\omega_m)t}$ for each state $|k\rangle e^{-i\omega_k t}$. If any of these products overlap in frequency with another state $|l\rangle e^{-i\omega_l t}$, resonant coupling between the $|k\rangle$ and $|l\rangle$ states occurs, significantly affecting both resonances. Since the goal of the present invention is to lift the degeneracy between $|\pm 1\rangle$ states, $L_m=1$ and $\omega_m=\omega_2-\omega_1$ might appear the most reasonable choice, so that the $|+1\rangle$ state gets resonantly coupled to the $|+2\rangle$ state, while no coupling occurs for the $|-1\rangle$ state, as illustrated in FIG. 1B. FIGS. 1B and 1C are graphs illustrating the transformation of the states with angular momentum ±1 in the frequency/angular momentum plane for the modulation orbital angular momentum being 1 and 2, respectively, in accordance with an embodiment of the present invention. Specifically, FIGS. 1B and 1C illustrate the transformation of the $|\pm 1\rangle$ states in the frequency and angular momentum plane for $L_m=1$ and $L_m=2$, respectively. Referring to FIG. 1B, $\omega_2$ is usually close to $2\omega_1$, and, as a result, $\omega_m$ should be close to $\omega_1$, which may be challenging to achieve especially at terahertz and optical frequencies. For $L_m=2$, in contrast, the states $|\pm 1\rangle$ resonantly couple to each other for $\omega_m=0$, as illustrated in FIG. 1C. For $\omega_m$ equaling zero, the structure is obviously reciprocal, but any small departure from zero can break reciprocity, and, no matter how large $\omega_1$ is, strong nonreciprocal response may be obtained by properly choosing $\Delta\epsilon_m$ and the resonator Q-factor, as will be discussed in more detail in the following.

This concept may be analyzed using coupled-mode theory: the amplitudes $\alpha_{\pm 1}$ of the $|\pm 1\rangle$ states satisfy the equations:

$$\dot{a}_{+1} = i\omega_1 a_{+1} + i\frac{1}{2}\omega_1 \kappa_m e^{-i\omega_m t} a_{-1}, \quad (1)$$

$$\dot{a}_{-1} = -i\omega_1 a_{-1} + i\frac{1}{2}\omega_1 \kappa_m e^{i\omega_m t} a_{+1},$$

where $$\kappa_m = 2\pi \int_{S_t} \Delta\epsilon_m |E_{t1}|^2 \, pd\rho dz \quad (2)$$

is the coupling coefficient between the $|\pm 1\rangle$ states, with $S_t$ being the modal cross-section of the resonator and $E_{t1}$ the corresponding normalized electric field distribution. For homogeneous resonators ($\Delta\epsilon_m$ and $\epsilon$ uniform, where $\epsilon$ is the background permittivity), $\kappa_m=\Delta\epsilon_m/2\epsilon$. The solution of Equation (1) provides the eigen-states of the modulated ring:

$$|\alpha\rangle = |+1\rangle e^{-i\omega_\alpha t} + \frac{\Delta\omega}{\omega_1 \kappa_m}|-1\rangle e^{-i(\omega_\alpha-\omega_m)t}, \quad (3)$$

$$|\beta\rangle = |-1\rangle e^{-i\omega_\beta t} - \frac{\Delta\omega}{\omega_1 \kappa_m}|+1\rangle e^{-i(\omega_\beta+\omega_m)t},$$

where $\Omega_\alpha=\omega_1-\Delta\omega/2$, $\omega_\beta=\omega_1+\Delta\omega/2$ and $\Delta\omega=\sqrt{\omega_m^2+\omega_1^2\kappa_m^2}-\omega_m$. This solution may be extended to take into account the presence of loss and coupling with the excitation signals.

The states $|\alpha\rangle$ and $|\beta\rangle$ are hybridizations of the non-modulated ring states $|+1\rangle$ and $|-1\rangle$, which are generally characterized by different frequencies and amplitudes, as illustrated in FIG. 1D. FIG. 1D is a frequency diagram of the eigen-states of the ring resonator of FIG. 1A without and with spatio-temporal modulation for $L_m=2$. In the absence of modulation ($\omega_m=0$), the sub-states $|\pm 1\rangle$ of each hybrid state share the same frequency and energy, as shown in FIGS. 1E and 1F, respectively, and the system is reciprocal as expected. FIG. 1E is a graph illustrating the substate eigenfrequencies versus the modulation frequency for $L_m=2$ in accordance with an embodiment of the present invention. FIG. 1F is a graph illustrating the substate energies versus the modulation frequency for $L_m=2$ in accordance with an embodiment of the present invention. However, when modulation is introduced ($\omega_m \neq 0$), the sub-states split (see FIG. 1E) and non-reciprocity arises. This splitting follows from the simultaneous spatial and temporal nature of the proposed modulation, generating the states $|k+2\rangle e^{-i(\omega+\omega_m)t}$ and $|k-2\rangle e^{-i(\omega-\omega_m)t}$ from $|k\rangle e^{-i\omega t}$ (see FIG. 1C). Therefore, if the sub-state $|+1\rangle$ exists at frequency $\omega$, the sub-state $|-1\rangle$ can only exist at frequency $\omega-\omega_m$. For $\omega_m \neq 0$ the energy is unevenly distributed between sub-states (see FIG.

1F), with the unbalance increasing with $\omega_m$. The dominant sub-states for $|\alpha\rangle$ and $|\beta\rangle$ are $|+1\rangle$ and $|-1\rangle$, respectively, as indicated in FIGS. 1D-1F (see lines 103-107). The secondary sub-states are indicated by lines 108-112 in FIGS. 1D-1F.

The amount of non-reciprocity is determined by the minimum distance between sub-states of opposite handedness $\Delta\omega_{min}=\min\{\omega_m, \omega_\beta-\omega_\alpha=\Delta\omega\}$ and by the resonance width $\omega_1/Q$, where Q is the resonance quality factor, corresponding to the inverse of the fractional bandwidth. In practical devices, such as polarization rotators and circulators, which are based on interference between states, $\Delta\omega_{min}$ and $\omega_1/Q$ is of the same order. It can be proven from Equation (3) that $\Delta\omega_{min}\leq\omega_1\kappa_m/\sqrt{3}$ with the maximum value holding for $\omega_m=\Delta\omega=\omega_1\kappa_m/\sqrt{3}$. Therefore $Q\kappa_m=\sqrt{3}$, consistently with the expectation that a lower Q resonator requires a higher $\kappa_m$ and subsequently a higher $\Delta\in_m$.

Consider now an ST-modulated metasurface 201 consisting of periodically arranged pairs of broadside-parallel metallic rings 202 patterned on both sides of a thin dielectric layer 203, as shown in FIG. 2A in accordance with an embodiment of the present invention. In one embodiment, metal rings 202 are formed on a substrate 204. Permittivity modulation is effectively obtained by loading the rings with time-variable capacitors $\Delta C_n=\Delta C_m \cos(\omega_m t-2\omega\varphi_n)$ at equidistant azimuthal positions $\omega_{n\pi}/4$, where n=0 . . . 7, which is equivalent to applying a continuous capacitance modulation $\Delta C=(4\Delta C_m/\pi)\cos(\omega_m t-2\varphi)$. Notice that the modulation amplitude $4\Delta C_m/\pi$ is the average of the localized capacitance $\Delta C_m$ over the discretization period $\pi/4$, as may be intuitively expected. A possible practical implementation of this capacitance modulation is illustrated in FIG. 2B in accordance with an embodiment of the present invention: it consists of a varactor 205, as its core element, a DC biasing source 206, an AC modulation source 207 with frequency $\omega_m$ and appropriate filters (band-stop filter (BSF) 208 and band-pass filter (BPF) 209) that minimize the interference between ring 202 and the biasing network. Such a circuit may be easily integrated into the ring substrate 204 (FIG. 2A) within conventional printed circuit technology. Furthermore, since varactors and filters are low-loss components, the overall power consumption is expected to be very low.

In the absence of modulation, metasurface 201 exhibits two resonances, shown in the inset of FIG. 2C in accordance with an embodiment of the present invention, a low-Q 'bright' mode at 23 GHz (see line 210) with parallel currents induced in the two rings 202, and a coupled high-Q 'dark' mode at 9 GHz (see line 211) with antiparallel currents. Suitable coupling between these two modes results in a peculiar Fano resonant response at 8.9 GHz, with a sharp transition from full to no transmission. This response is ideal for the purpose of the present invention, since its sharp frequency response relaxes the requirements on the modulation capacitance, and, at the same time, leads to strong non-reciprocal effects because of the associated antiparallel currents in the rings, maximizing the excitation of the modulation capacitors.

FIG. 2D is a graph illustrating the transmission of circularly polarized (CP) waves through metasurface 201 (along +z) for $\Delta C_m=0.02$ pF and $f_m=100$ MHz in accordance with an embodiment of the present invention. The chosen value of $\Delta C_m$ corresponds to an effective capacitance modulation of 0.026 pF/rad, which, considering the ring-pair capacitance 0.48 pF/rad, leads to $\kappa_m=0.027$. This yields $\omega_1 k_m \approx 0.24$ GHz, which is enough for a clear separation between $|\alpha\rangle$ and $|\beta\rangle$ states. Small variations of $\Delta C_m$ that may occur in practice can be easily compensated by adjusting $\omega_m$, as long as the $|\alpha\rangle$ and $|\beta\rangle$ states are distinguishable.

As expected, the response is different for right-handed CP (RHCP) (see line 212) and left-handed CP (LHCP) excitations (see line 213), and in each case two resonant dips are observed, with the stronger one resulting from coupling with the state whose dominant sub-state is of the same handedness as the incident wave. RHCP incident waves 212 strongly couple to $|\alpha\rangle$ at frequency $f_\alpha$, while LHCP waves 213 strongly couple to $|\beta\rangle$ at $f_\beta$. The weaker resonant dips correspond to the secondary sub-states at $f_\beta+f_m$ (RHCP excitation, substate $|+1\rangle$ of $|\beta\rangle$) and $f_\alpha-f_m$ (LHCP waves, $|-1\rangle$ of $|\alpha\rangle$). If the structure is excited from $-z$, the transmission curves of FIG. 2C switch handedness, as the incident wave feels opposite modulation spin, a clear demonstration of non-reciprocity. This polarization transmission asymmetry can be exploited to realize, for instance, a CP isolator by placing the transmission null of one polarization at the same frequency as the transmission peak of the other polarization. This condition is fulfilled for $f_m=0.5$ GHz, as shown in FIG. 2E in accordance with an embodiment of the present invention. FIG. 2E is a graph illustrating the transmission of circularly polarized (CP) waves through metasurface 201 (along +z) for $\Delta C_m=0.02$ pF and $f_m=0.5$ GHz in accordance with an embodiment of the present invention. Referring to FIG. 2E, at 8.91 GHz, RHCP and LHCP waves (see lines 214, 215, respectively) can penetrate metasurface 201 only from $-z$ and $+z$, respectively. This operation may be the basis of different types of polarization-dependent microwave isolators.

Another important non-reciprocal effect, common in ferromagnetic materials, is Faraday rotation, i.e., the non-reciprocal rotation of the polarization plane of a wave, as it propagates through the material. The rotation is opposite for opposite propagation directions, as it is determined by the (fixed) bias direction. One can achieve the same effect in the proposed ST modulated metasurface 201 (see FIG. 2A), as shown in FIG. 3A, which plots the polarization rotation angle $\theta$ for different $f_m$ and $\Delta C_m=0.02$ pF in accordance with an embodiment of the present invention. As the modulation frequency increases, $\theta$ increases and the bandwidth decreases. The bandwidth reduction is clearly due to the decrease of $\Delta\omega$ as $f_m$ increases, but the monotonic increase of $\theta$ may seem contradictory with the fact that the separation between states, which determines the amount of non-reciprocity, is actually reduced as $f_m$ increases. This peculiar monotonic increase of $\theta$ results from the fact that at resonance the transmission coefficient for x-polarized waves $T_{xx}$ decreases faster than the transmission coefficient of x- to y-polarized waves $T_{yx}$, so that $T_{yx}/T_{xx}$, which is proportional to $\theta$, actually increases. For $f_m=0.5$ GHz, $T_{yx}$ is maximum and $\theta=60°$, corresponding to a giant rotation of 6000° per free-space wavelength, without any magnetic bias. FIG. 3B is a graph illustrating the ellipticity angle $\chi$ at the output for linearly polarized inputs in accordance with an embodiment of the present invention. As shown in FIG. 3B, ellipticity angle $\chi$ is zero at the frequency of maximum $\theta$, implying that the transmitted field is linearly polarized, making the proposed metasurface particularly exciting for applications requiring non-reciprocal linear polarization rotation.

As previously discussed, the proposed scheme of ST modulation with $L_m=2$ poses no restriction on the modulation frequency, opening the possibility to apply the proposed concept to optical frequencies. As a proof of concept, an optical isolator based on an ST modulated channel-drop filter was designed with the following geometrical parameters of the optical isolator 401 (shown in FIGS. 4A and 4B):

R (radius of optical ring resonator)=0.88a, w (width of channel/drop waveguide)=0.2a and g (gap between ring and waveguide)=0.3a, where a is an arbitrary reference length. For operation with a wavelength of 1.55 µm, the corresponding absolute values are a=1.04 µm, R=0.92 µm, w=0.21 µm and $f_m$=60 GHz. The modulation frequency for the case of FIG. 4B (discussed further below) is $f_m$=2×10$^{-4}$ (c/a), where c is the speed of light. The optical isolator 401 of FIGS. 4A and 4B includes an optical ring resonator 402, which is between a set of waveguides (channel waveguide 403 with ports 1 and 2 and drop waveguide 404 with ports 3 and 4). Optical isolator 401 of FIGS. 4A and 4B is formed on a substrate 405. When light of a resonant wavelength is passed through the loop from the input waveguide (e.g., waveguide 403), it builds up in intensity over multiple round-trips in ring resonator 402 due to constructive interference and is output to the output waveguide (e.g., waveguide 404) which serves as a detector waveguide. The discussion of the operation of optical ring resonator 402 will be discussed below in connection with FIGS. 4A-4B. FIG. 4A is a graph illustrating transmission versus frequency without modulation for optical ring resonator 402 discussed above in accordance with an embodiment of the present invention. FIG. 4B is a graph illustrating non-reciprocal transmission versus frequency with spatio-temporal (ST) modulation turned on for the optical isolator discussed above in accordance with an embodiment of the present invention.

As shown in FIG. 4A, without modulation, the power entering structure through the channel waveguide 403 from either port 1 or 2 couples to the right- or left-handed ring resonance, respectively, creating a transmission dip at resonance. Splitting the ring resonances with proper azimuthal ST modulation moves the transmission dips to different frequencies for opposite propagation directions, thus creating non-reciprocity. The isolator 401 can be realized on silicon (Si), which exhibits the strongest electro-optic effect observed to date, with typical values around $\Delta\epsilon_m$=5×10$^{-4}$ $\epsilon_s$, where $\epsilon_s$ is its permittivity, leading to $\epsilon_m$≈2.5×10$^{-4}$. Such permittivity modulation can be obtained using PIN diodes. According to the bandwidth criterion $QC_m$=√3, a Q-factor ~7,000 would be sufficient for adequate separation of the |α⟩ and |β⟩ states. Such level of Q-factor is common in Si-photonics integrated systems, and in the design of FIG. 4A, it is achieved using the 11-th azimuthal resonance of ring 402. Although the theory above was derived for the |±1⟩ states, it can be easily extended to any pair of states |±l⟩ by substituting $L_m$=2 with $L_m$=2l. Therefore, $L_m$=22 in the design of optical isolator 401, which may be achieved by uniformly integrating 88 PIN diodes along the ring perimeter of ring 402, leading to a separation of 65 nm between consecutive diodes. It should be noted that this design has not been optimized and that a significantly lower number of PIN diodes may be still sufficient to achieve a similar effect in optimized geometries.

The simulated scattering parameters of the structure without and with modulation are presented in FIGS. 4A and 4B, respectively. In the absence of modulation, $S_{21}$=$S_{12}$ ($S_{ij}$ being the transmission coefficient from port j to port i), meaning that the system is reciprocal. When the modulation is applied, the right- and left-handed resonances of the ring split and non-reciprocity occurs, as shown in FIG. 4B. For instance, at the right-handed resonance, indicated in FIG. 4B with the dashed line, transmission from port 1 to 2 is significantly lower than transmission from port 2 to 1, an effect that can also be seen in the corresponding field plots in the inset. This operation is obtained within a ring structure that is comparable in size to the operation wavelength λ=1.55 µm, and without the need of magnetic bias.

The principles of the present invention provide a new paradigm to achieve magnetic-free non-reciprocity via angular momentum biasing based on resonant rings with specifically tailored ST azimuthal modulation. The proposed form of modulation removes the degeneracy between opposite resonant states, which, combined with suitably induced high-Q response, realizes giant non-reciprocity in subwavelength components with moderate modulation frequencies and amplitudes. A few applications based on this approach have been presented, including an ultrathin radio-frequency isolator, giant Faraday rotation and an optical isolator, all realized without requiring bulky magnetic biasing elements. The proposed approach opens pathways towards non-reciprocal integrated microwave and nanophotonic components for a variety of applications.

In another embodiment of the present invention, spatiotemporal biasing is used to generate the electrical rotation necessary for angular-momentum biasing as discussed further below. Such an approach adds several benefits, including, but not limited to, being compact, scalable in frequency, fully compatible with complex integrated circuits, inherently linear and consisting of completely passive components.

When a three port resonator is biased with a magnetic field, as seen in FIG. 5A, the degenerate counter rotating modes are split, leading to the non-reciprocal response required in a circulator. FIG. 5A illustrates magnetically biased three-port junction 500, resulting in a non-reciprocal scattering response in accordance with an embodiment of the present invention. This approach is generally used to realize ferromagnetic-based circulators. The angular-momentum biasing technique relies on electrical rotation, which may be realized in several designs. The spatiotemporal biasing technique may be applied to both microstrip and lumped element resonators, as shown in FIGS. 5B(1)-5B(2). FIGS. 5B(1)-5B(2) illustrate an angular-momentum-biased ring circulator 501 and spatiotemporally-modulated lumped circuit circulator 502 in accordance with an embodiment of the present invention. Modulation of the capacitance of the ring electrically emulates the angular-momentum "spin." At microwave frequencies, such a modulation is implemented by loading the ring with varactors. Other modulation techniques, such as with micromechanical capacitors or FET-based variable capacitors, are available, but ease of integration and cost considerations led to the choice of varactors for the microwave frequency designs.

The conditions for maximum isolation in a circulator may be derived from temporal coupled mode theory as, $$f_1 = f_2 \kappa_1 / \sqrt{3}, \quad Q\kappa_1 = 1, \quad (4)$$

where $f_1$ is the modulation frequency, $f_2$ the carrier frequency, Q is the quality factor of the resonator, and $\kappa_1$ is the coupling coefficient between the counter-rotating modes introduced by the angular-momentum biasing.

A three-port microstrip ring resonator was designed and simulated to operate at approximately 885 MHz. Based on the design principles in Equation (4), the modulation frequency was set to 4.5 MHz. The results from the simulation confirmed the non-reciprocal response, with over 38 dB isolation from the two output ports. The scattering parameters with and without angular-momentum biasing are shown in FIG. 6. FIG. 6 is a graph of the simulated results for the magnitude of the transmission coefficients in a microstrip resonator 601 designed following the same principle as in FIG. 9 (discussed below) in accordance with an embodiment of the present invention. Without angular-modulation (AM) biasing, the transmission magnitude is the same in the two output ports (black line and marker), regardless of direction. When the modulation signal is applied, the degenerate modes are split, leading to 38 dB isolation at 885 MHz. The physical layout of the ring resonator 601 with coupling ports is shown in the inset of FIG. 6.

Referring to FIG. 6, in one embodiment, the RF signal is sent to ports 1, 2 and 3 of ring resonator 601, the DC signal is sent to ports 602A-602C and the modulation signal is sent to ports 603A-603C.

Without modulation, the transmission response is reciprocal, with the magnitude identical regardless of direction of propagation and reduced compared to the modulated case, due to splitting of the power between the two output ports. When the modulation is turned on, however, large isolation and strong non-reciprocal response is achieved, without relying on any magnetic material or bias.

Hence, the spatiotemporal azimuthal biasing method presented herein to produce effective angular momentum in a resonant ring was shown to effectively realize strong non-reciprocal response, without requiring ferromagnetic materials or external magnetic bias. Passive, reciprocal resonators were experimentally shown to provide over 38 dB of isolation when the angular-momentum biasing technique was applied.

The angular-momentum-biasing concept is not only fully integratable in printed circuit board technology, but it is also largely tunable and scalable; the same approach may be applied even to the terahertz and optical spectra. The angular-momentum biasing method provides a scalable, cost effective, and compatible solution for conventional, non-reciprocal components. These results are believed to pave the way to a new route to replace conventional magnetically-biased non-reciprocal isolators, circulators and phase shifters with fully integrated components.

In another embodiment of the present invention, non-reciprocity is based on modulated coupled resonators thereby providing a different way to efficiently induce large non-reciprocity in a deeply subwavelength device based on angular-momentum biasing. In this embodiment, the trade-off between fabrication complexity and non-reciprocal effects is overcome. Furthermore, in this embodiment, non-reciprocity is demonstrated with 100% modulation efficiency and only 3 separate modulation regions. The proposed ring structure 700 is shown in FIG. 7A. FIG. 7A illustrates a ring structure 701 consisting of three strongly coupled identical and symmetrically-coupled resonant tanks 701A-701C with resonance frequency $\omega_0$ and coupling factor $\kappa$ in accordance with an embodiment of the present invention. Resonant tanks 701A-701C may collectively or individually be referred to as resonant tanks 701 or resonant tank 701, respectively. Modulation is applied here on the resonant frequencies of the individual tanks 701, so that they deviate from their static values as $\omega_1(t)=\omega_0+\delta\omega_m\cos(\omega_m t)$, $\omega_2(t)=\omega_0+\delta\omega_m\cos(\omega_m t+2\pi/3)$ and $\omega_3(t)=\omega_0+\delta\omega_m\cos(\omega_m t+4\pi/3)$, with $\delta\omega_m$ the modulation amplitude. Without modulation, such a device supports two degenerate counter-rotating modes. When modulation is switched on, however, the degeneracy is lifted and non-reciprocity is produced. The experimental evidence provided herein is in the radio-frequency (RF) band, but this approach is applicable to any frequency band and even to different types of waves, since no assumption is made whatsoever about the type of resonators.

In the absence of modulation ($\delta\omega_m=0$), the ring of FIG. 7A supports three states: a common one with state vector $|c\rangle=[1\ 1\ 1]^T$ and frequency $\omega_c=\omega_0+2\kappa$, and two degenerate right- and left-handed ones with state vectors $|\pm\rangle=[1\ e^{\pm i2\pi/3}\ e^{\pm i4\pi/3}]^T$ and frequencies $\omega_\pm=\omega=\omega_0-\kappa$. The components of the state vectors provide the complex amplitudes of the three resonators. The applied modulation mixes right- and left-handed states, producing two new hybrid states $$|R\rangle = |+\rangle e^{-i\omega_R t} - \frac{\Delta\omega}{\delta\omega_m}|-\rangle e^{-i(\omega_R-\omega_m)t} \qquad (5)$$

$$|L\rangle = |-\rangle e^{-i\omega_L t} + \frac{\Delta\omega}{\delta\omega_m}|+\rangle e^{-i(\omega_L+\omega_m)t},$$

where $\Delta\omega=\sqrt{\omega_m^2+\delta\omega_m^2}-\omega_m$, $\omega_R=\omega_+-\Delta\omega/2$ and $\omega_L=\omega_++\Delta\omega/2$. Equation (5) is valid to the order $O(\delta\omega_m^2)$ for $\omega_m\ll\omega_\pm-\omega_+$. Notice, that the hybrid states $|R\rangle$ and $|L\rangle$ have an expression identical to those of the ring of FIG. 1A. However, in contrast to its functionality, which requires a continuous, fast-oscillating spatiotemporal modulation, the structure of FIG. 7A is modulated with only three signals.

For $\omega_m>0$ the sub-states of each hybrid state have different amplitudes, indicating the existence of a dominant and a secondary sub-state for each hybrid state: $|+F\rangle$ and $|-\rangle$ are the dominant sub-states of $|R\rangle$ and $|L\rangle$, respectively. The dominant sub-states support non-reciprocity, while the secondary ones result in intermodulation products at frequencies $\omega\pm\omega_m$ for an incident signal with frequency $\omega$. In a proper design, these by-products should fall outside the band of interest, so that they can be easily filtered out. Such a requirement is satisfied if $\omega_m$ is larger than the bandwidth of the input signal, thus setting a lower limit on $\omega_m$ in practical applications. It can be seen from FIG. 7B that the power distributed to the secondary sub-states, i.e., the intermodulation product, decreases as $\omega_m$ increases, however with a simultaneous decrease of the frequency separation $\Delta\omega$ between the dominant sub-states. A smaller $\Delta\omega$ generally requires a higher Q-factor for the coupled resonator, indicating a trade-off between intermodulation suppression and overall bandwidth. FIG. 7B is a frequency diagram of the hybrid states $|R\rangle$ and $|L\rangle$ of the modulated ring versus $\omega_m$ in accordance with an embodiment of the present invention. The thickness of the lines represents the energy carried by the sub-states of the hybrid states.

Figure 8A:
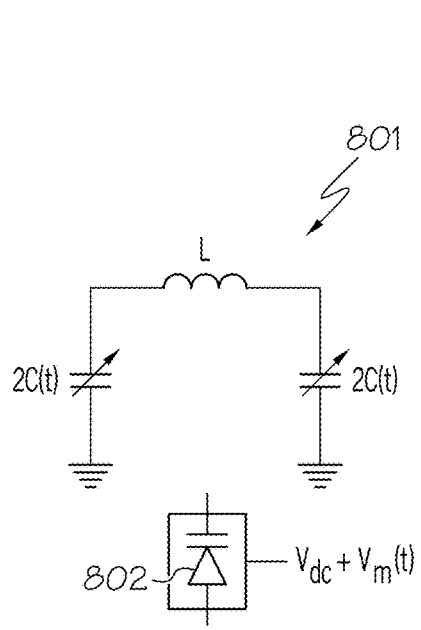
FIG. 8A illustrates the constituent resonator of the ring: an L-C tank with modulated capacitance in accordance with an embodiment of the present invention.

The structure of FIG. 7A was realized at RF using three simple L-C tanks, as in FIG. 8A, where the capacitance C is equally distributed at both sides of the inductance L to maintain a symmetric structure. FIG. 8A illustrates the constituent resonator 801 of the ring 700 (FIG. 7A): an L-C tank with modulated capacitance in accordance with an embodiment of the present invention.

Figure 8B:
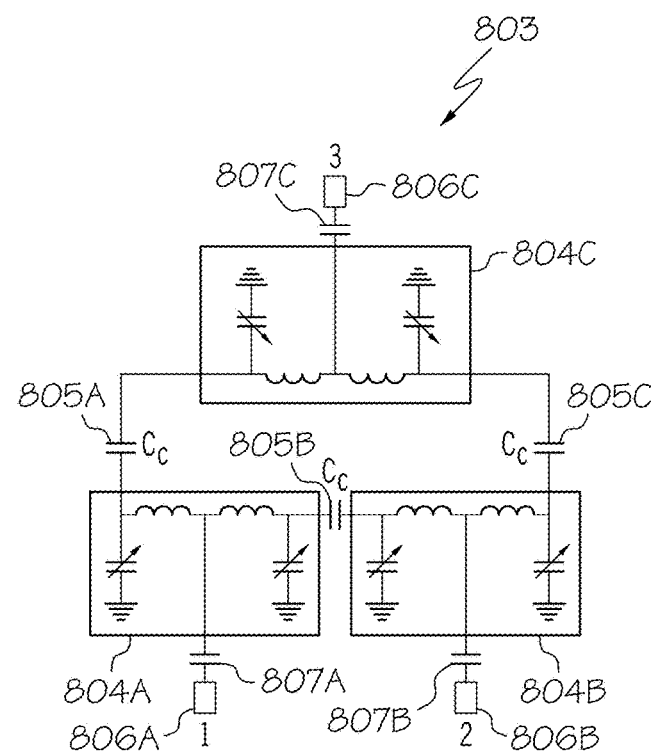
FIG. 8B illustrates a ring formed by three identical resonators coupled through three identical capacitances $C_c$ in accordance with an embodiment of the present invention.

Referring to FIG. 8A, capacitance is equally distributed at both sides of the inductance for symmetry purposes. Capacitance modulation is achieved via varactor diodes 802, controlled by a static signal $V_{dc}$ and the modulation signal $v_m(t)$. The resonance frequency modulation is achieved via capacitance modulation, commonly obtained in RF with varactor diodes. These diodes are biased by two signals, a static one $V_{dc}$, which provides the required reverse bias to the diodes and controls their static capacitance, and an RF one $v_m$ with frequency $\omega_{in}$ and amplitude $V_m$, providing the modulation. Assuming that resonators 801 are coupled to each other through a capacitance $C_c$, as in FIG. 8B, the frequencies of the common and rotating states read $\omega_c=\omega_0/\sqrt{1+2C_c/C}$ and $\omega_\pm=\omega_0\sqrt{(C+3C_c/2)/(C+2C_c)}$, respectively, where $\omega_0=1/\sqrt{LC}$ is the resonance frequency of each tank. FIG. 8B illustrates a ring 803 formed by three identical resonators 804A-804C coupled through three identical capacitances $C_c$ 805A-805C in accordance with an embodiment of the present invention. Resonators 804A-804C may collectively or individually be referred to as resonators 804 or resonator 804, respectively. Each resonator 804A-804C is configured similarly as resonator 801 of FIG. 8A except being further coupled to an external microstrip transmission line 806A-806C through capacitances 807A-807C, respectively. Capacitances 805A-805C may collectively or individually be referred to as capacitances 805 or capacitance 805, respectively. Transmission lines 806A-806C may collectively or individually be referred to as transmission lines 806 or transmission line 806, respectively. Capacitances 807A-807C may collectively or individually be referred to as capacitances 807 or capacitance 807, respectively.

Referring to FIG. 8B, if the amplitude of the capacitance modulation is $\Delta C_m$, the frequency modulation amplitude is found as $\delta\omega_m = \omega_\pm \Delta C_m/(2C)$. Note that $\Delta C_m$, and consequently $\delta\omega_m$, are proportional to $V_m$. Furthermore, it was observed that $\omega_c$, $\omega_\pm$ and $\delta\omega_m$ are different from the predictions of the coupled-mode analysis for the general structure of FIG. 7B, a known issue related to the dependence of the average frequency of a coupled system on the coupling element, which however, does not affect the validity of Equation (5) and the subsequent analysis. As it will become clearer in the following, $\omega_c$ should be as far as possible from $\omega_\pm$ in order for the common mode not to affect the operation of the structure at $\omega_\pm$ where non-reciprocity occurs. In the lumped-element circuit of FIG. 8B, this condition is satisfied by taking $C_c \to \infty$ or equivalently coupling the tanks through a short circuit, yielding $\omega_c = 0$ and $\omega_\pm = \omega_0\sqrt{3}/2$.

The non-reciprocal response of the circuit of FIG. 8B is demonstrated by capacitively coupling it to three microstrip transmission lines 806, to realize a three-port device. Exciting the structure from, e.g., port 1, at frequency $\omega_+$ results in the excitation of $|R\rangle$ and $|L\rangle$ with same amplitude and opposite phase $\varphi_R = -\varphi_L$, due to the symmetrical distribution of these states around $\omega_+$. Then, the signals at ports 2 and 3 are proportional to $e^{i2\pi/3}e^{i\varphi_R} + e^{i4\pi/3}e^{i\varphi_L}$ and $e^{-i2\pi/3}e^{i\varphi_R} + e^{-i4\pi/3}e^{i\varphi_L}$, respectively, as the superposition of $|R\rangle$ and $|L\rangle$ at these ports. If $\delta\omega_m$ and $\omega_m$ are selected so that $\varphi_R = -\varphi_L = -\pi/6$, the signal at port 3 is identically zero, while the one at port 2 is non-zero, indicating routing of the incident power from port 1 to port 2. Due to the symmetry of the structure with respect to its ports, incident power from ports 2 and 3 is similarly routed to ports 3 and 1, thus realizing the functionality of a circulator with infinite isolation. Notice, that the preceding description assumes a weak excitation of the common state, which makes clear the importance of choosing its resonance frequency as far as possible from the resonance frequency of the rotating states.

Figure 9:
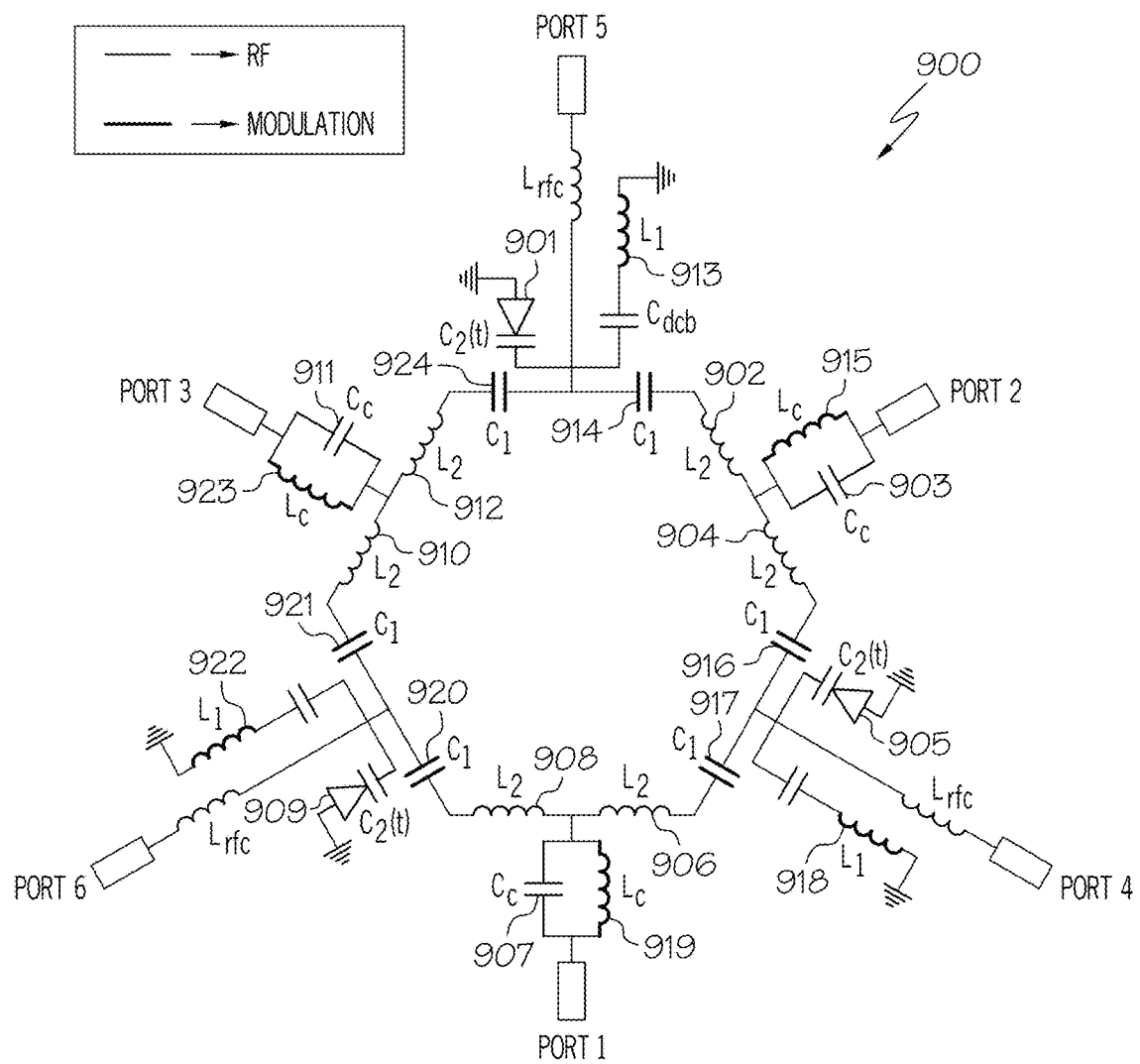
FIG. 9 illustrates the physical layout of the RF non-reciprocal coupled-resonator ring in accordance with an embodiment of the present invention.

FIG. 9 illustrates the physical layout of the RF non-reciprocal coupled-resonator ring 800 in accordance with an embodiment of the present invention.

Referring to FIG. 9, ports 1, 2 and 3 provide access to ring 900 for the RF and modulation signals. Ports 4, 5 and 6 provide access to ring 900 for the static biasing voltage. Elements 901-912 are effective for the RF signal; whereas, elements 913-924 are effective for the modulation signal. A detail description of the circuit is provided below.

Ring 900 is designed to resonate at two frequencies: the modulation frequency $f_m$ and the radio frequency (RF) $f_{RF}$. As a result, three additional ports are avoided for feeding the modulation signals and filters that prevent the RF signal to leak into the modulation ports and vice-versa, thus significantly simplifying the design. The modulation and RF frequencies are respectively determined by elements 901-912 and elements 913-924 in FIG. 9, respectively. In particular, $$\omega_m = 2\pi f_m = \frac{2}{\sqrt{3}} \frac{1}{\sqrt{L_1 C_1}} \tag{6}$$

$$\omega_{RF} = 2\pi f_{RF} = \frac{\sqrt{3}}{2} \frac{1}{\sqrt{L_2 C_2}}. \tag{7}$$

Equation (6) holds when the impedance of $L_2$ and $L_1$ are respectively much smaller than the corresponding of $C_1$ and $C_2$ at $\omega_m$. Similarly, Equation (7) holds when the impedance of $L_2$ and $L_1$ are respectively much larger than the corresponding of $C_1$ and $C_2$ at $\omega_{RF}$. These conditions are summarized in the expressions $$\omega_m L_2 \ll \frac{1}{\omega_m C_1}, \quad \omega_m L_1 \ll \frac{1}{\omega_m C_2}, \tag{8}$$

$$\omega_{RF} L_2 \gg \frac{1}{\omega_{RF} C_1}, \quad \omega_{RF} L_1 \gg \frac{1}{\omega_{RF} C_2}. \tag{9}$$

Equation (8) implies that the inductors $L_2$ and the capacitors $C_2$ are short and open circuits for the modulation signal at $\omega_m$. On the other hand, Equation (9) implies that the capacitors $C_1$ and the inductors $L_1$ are short and open circuits for the RF signal at $\omega_{RF}$. In practice, Equations (8) and (9) are considered to hold if $$\alpha\omega_m L_2 = \frac{1}{\omega_m C_1}, \quad \alpha\omega_m L_1 = \frac{1}{\omega_m C_2}, \tag{10}$$

$$\omega_{RF} L_2 = \frac{\alpha}{\omega_{RF} C_1}, \quad \omega_{RF} L_1 = \frac{\alpha}{\omega_{RF} C_2}, \tag{11}$$

where $\alpha \geq 10$. Equations (10) and (11) are mutually satisfied if $\omega_{RF} = \alpha\omega_m$. Then, solving Equations (6), (7), (10) and (11) yields $$L_1 = \frac{4\alpha}{3} L_2, \quad C_1 = \frac{4\alpha}{3} C_2. \tag{12}$$

The capacitance $C_2$ is the static capacitance of the varactors. For the varactor model used in the design of the present invention (Skyworks SMV 1237) and for a static bias voltage of 3 V, $C_2 = 30$ pF. Then, if $f_{RF} = 150$ MHz, $L_2$ is found from Equation (7) as $L_2 = 28$ nH. Subsequently, for the minimum value of $\alpha$, $\alpha = 10$, $f_m = 15$ MHz, $L_1 = 370$ nH and $C_1 = 400$ pF.

The capacitors $C_c$ and the inductors $L_c$ provide the coupling of the RF and modulation signals to ring 900. Similar to the resonant elements of ring 900, the following conditions should hold in order for the RF and modulation signals to couple only through $C_c$ and $L_c$, respectively:

$$\alpha\omega_{RF} L_c = \frac{1}{\omega_{RF} C_c}, \tag{13}$$

$$\omega_m L_c = \frac{\alpha}{\omega_m C_c}. \tag{14}$$

Observe that, as before, Equations (13) and (14) mutually hold if $\omega_{RF} = \alpha\omega_m$. The coupling capacitance $C_c$ determines the Q-factor of ring 900. For obtaining strong non-reciprocity, $\omega_{RF} \sim Q\omega_m$, leading to $Q \sim 10$, since $\omega_{RF}=10\ \omega_m$. Having selected the value of $C_c$ which provides the desired Q-factor, $L_c$ can be calculated from Equation (14).

The inductors $L_{rfc}$ are used to prevent the RF and modulation signals from leaking to the DC source. For this purpose, any value larger than 1 µm is sufficient. Indeed, the impedance of $L_{rfc}$ at the RF frequency of 150 MHz is 943Ω, which is much larger than the impedance 35Ω of the varactor, meaning that the RF signal mainly flows through the varactor. Similarly, the impedance of $L_{rfc}$ at the modulation frequency of 15 MHz is 94Ω, which is fairly larger than the impedance 35Ω of the inductance $L_1$, meaning that the modulation signal mainly flows through $L_1$. The capacitance $C_{dcb}$ blocks the DC signal from leaking to the ground through $L_1$, while appearing as a short circuit at RF and modulation frequencies. A value of 10 µF, corresponding to an impedance of 1 mΩ and 0.1 mΩ at 15 MHz and 150 MHz, respectively, is enough for this purpose.

The values of the lumped elements used in the fabricated layout are listed in a table 1000 shown in FIG. 10 in accordance with an embodiment of the present invention. Notice, that these values are slightly different than the ones calculated before due to restrictions in the available commercial elements. Elements 901-924 (FIG. 9) are of 0603 and 0805 surface mount technology (SMT). Furthermore, the circuit was fabricated in a FR4 substrate and the external microstrip lines as well as the ones connecting the elements between themselves were designed to have a characteristic impedance of 50Ω.

Figure 11:
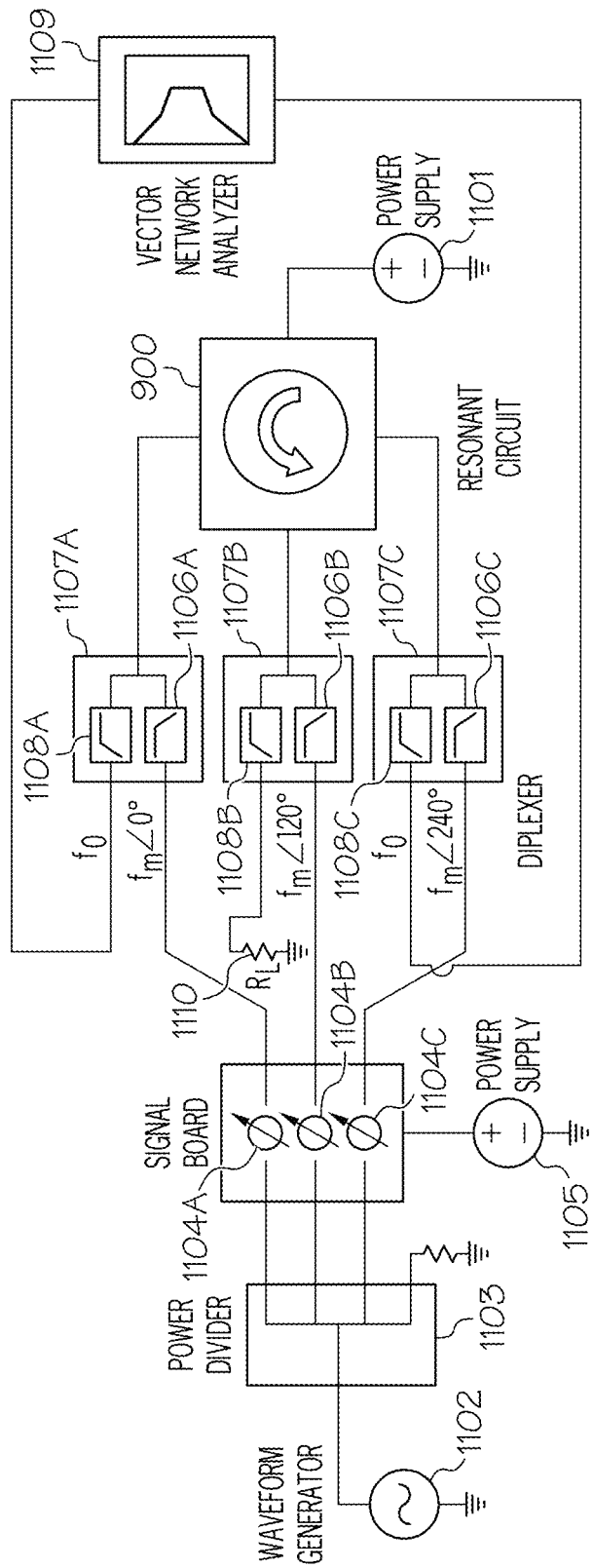
FIG. 11 illustrates the experimental setup in accordance with an embodiment of the present invention.

A description of the experimental setup is discussed below in connection with FIG. 11. FIG. 11 illustrates the experimental setup in accordance with an embodiment of the present invention. As illustrated in FIG. 11 in conjunction with FIG. 9, the static biasing of ring 900 is provided by a DC power supply 1101, whose output is connected to ports 4, 5 and 6 of ring 900. For the generation of the modulation signals, a single waveform generator 1102 is used. The output of generator 1102 is split evenly into three signals through a power divider 1103 and then routed to three phase shifters 1104A-1104C which provide the necessary phase difference of 120° between the modulation signals. Phase shifters 1104A-1104C are powered with a second DC source 1105 and potentiometers (not shown) are used to control their phase. The outputs of phase shifters 1104A-1104C are connected to the low-pass ports 1106A-1106C of three diplexers 1107A-1107C in order to combine the modulation signals with the RF ones. The high-pass ports 1108A, 1108C of two of the diplexers 1107A, 1107C are connected to the ports of a vector network analyzer 1109, while the high-pass port 1108B of diplexer 1107B is terminated to a matched load 1110. The outputs of diplexers 1107A-1107C are led to the ports 1, 2 and 3 of ring 900. Rotating diplexers 1107A-1107C where the VNA ports are connected allows for the measurement of all the S-parameters of the circuit. The equipment used during the measurement of ring 900 is listed in a table 1200 shown in FIG. 12 in accordance with an embodiment of the present invention.

Figure 8C:
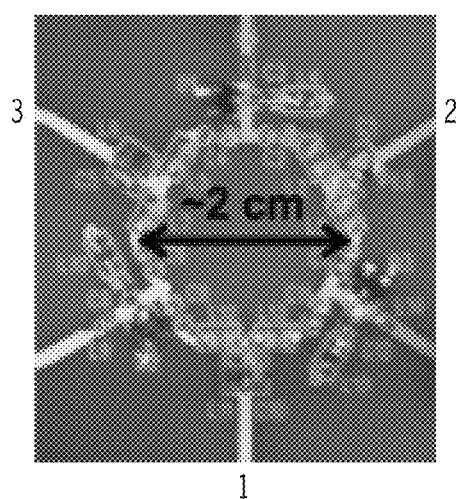
FIG. 8C is a photograph of the fabricated prototype of the ring of FIG. 8B in accordance with an embodiment of the present invention.
Figures 12, 13A:
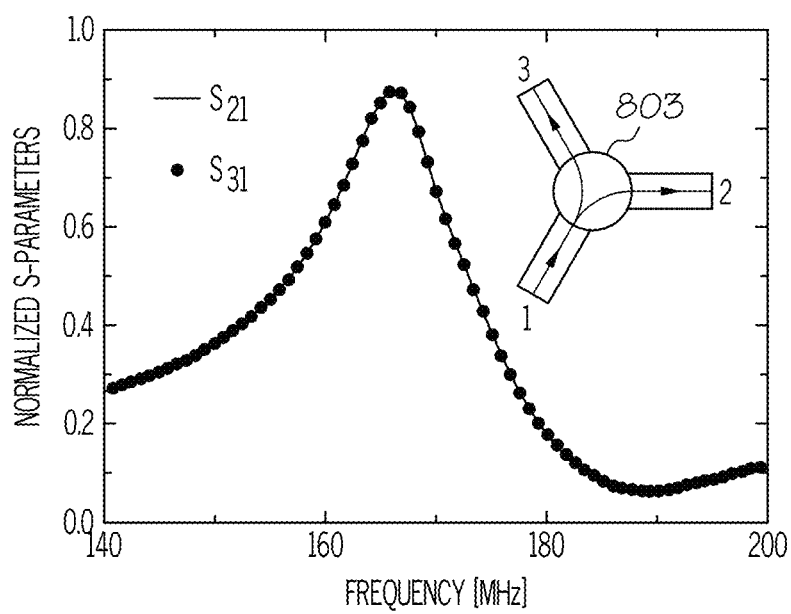
FIG. 12 is a table of the equipment used during the measurement of the ring in accordance with an embodiment of the present invention.
FIG. 13A is a graph illustrating the measured transmission from port 1 to ports 2 and 3 for no modulation ($V_m$=0 V), where the power is equally split to the output ports (ports 2 and 3) in accordance with an embodiment of the present invention.

The realized device was designed to resonate at 170 MHz with a Q-factor of about 10 for $V_{dc}=1.99$ V and $V_m=0$. The modulation frequency was set to 15 MHz, in order for the modulation by-products to fall outside the resonance band, whose bandwidth is here around 15 MHz. A photograph of the fabricated prototype can be found in FIG. 8C in accordance with an embodiment of the present invention. Without modulation, the signal from each port is equally split to the other two ports, as expected from symmetry, and the system is fully reciprocal as illustrated in FIG. 13A. FIG. 13A is a graph illustrating the measured transmission from port 1 to ports 2 and 3 for no modulation ($V_m=0$ V), where the power is equally split to the output ports (ports 2 and 3) as illustrated in the inset (representing circulator 803 of FIG. 8) in accordance with an embodiment of the present invention. The subscripts to the S-parameters or scattering parameters, as shown in FIG. 13A and in other Figures as well as discussed below, represent the ports, where the first number represents the final port and the second number represents the initial port in connection with the measured transmission.

Figure 13B:
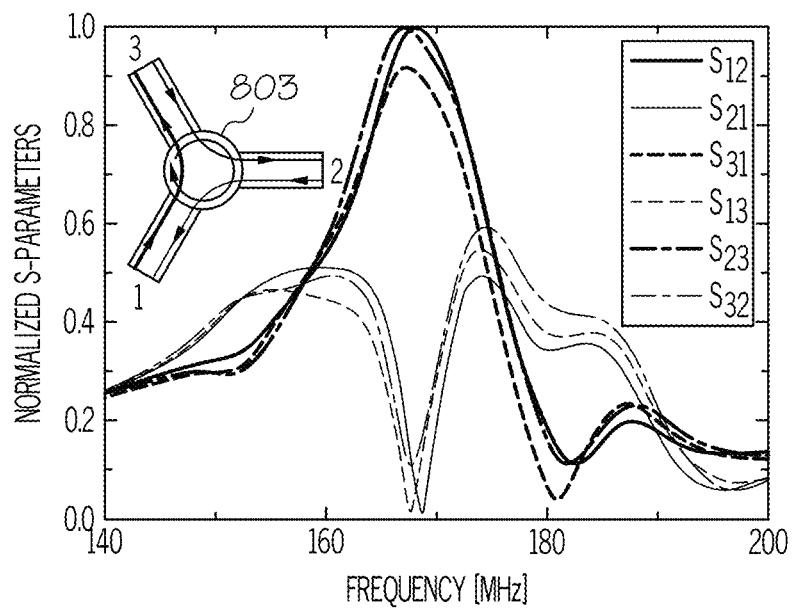
FIG. 13B is a graph illustrating the measured scattering parameters when $V_m$=0.6 V in accordance with an embodiment of the present invention.

When the modulation signal is switched on, this symmetry is broken and power is unequally split to the two output ports. By varying the modulation amplitude, it is possible to find a value for which all the power entering the ring from port 1 is routed to port 3, corresponding to the $\varphi_R=-\varphi_L=-\pi/6$ condition previously described. This is visible in FIG. 13B, showing the measured S-parameters of the structure for $V_m=0.6$ V. FIG. 13B is a graph illustrating the measured scattering parameters when $V_m=0.6$ V in accordance with an embodiment of the present invention. As illustrated in FIG. 13B, incident power to ports 1, 2 and 3 is transmitted to ports 3, 1 and 2, respectively, thus realizing a three-port circulator as illustrated in the inset (representing circulator 803). At the resonance frequency of 170 MHz, power incident to ports 1, 2 and 3 is routed to ports 2, 3 and 1, demonstrating the operation of an ideal, magnetic-free, deeply subwavelength linear circulator.

Figure 13C:
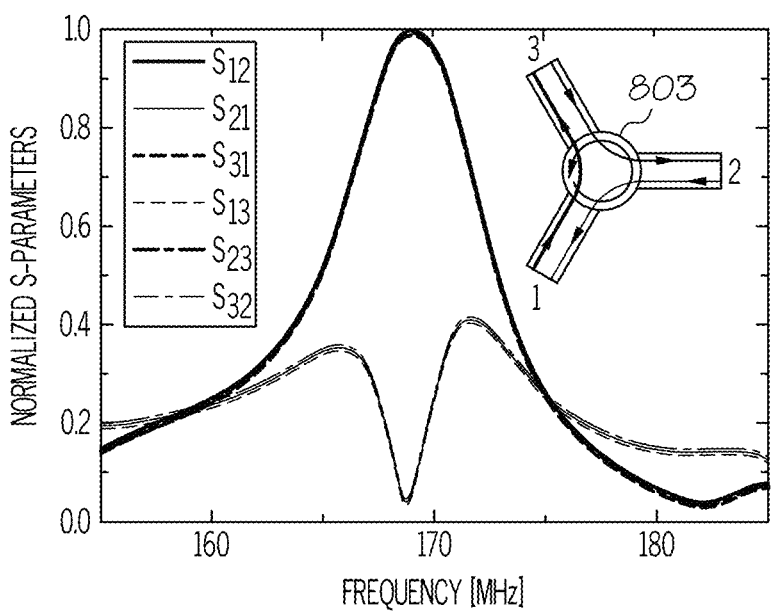
FIG. 13C presents the S-parameters obtained through combined full-wave and circuit simulations in accordance with an embodiment of the present invention.

For comparison, FIG. 13C presents the S-parameters obtained through combined full-wave and circuit simulations in accordance with an embodiment of the present invention. All the results in FIGS. 13A-13C refer to $V_{dc}=1.99$ V.

Figure 14A:
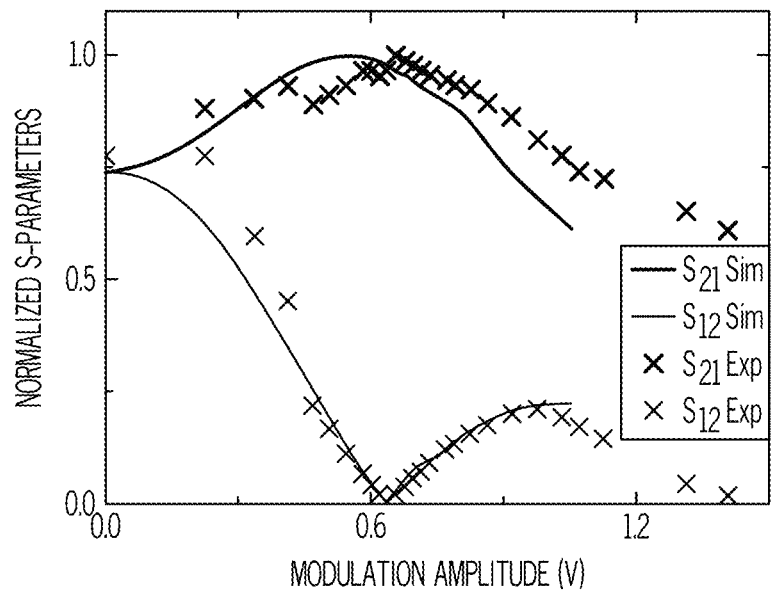
FIG. 14A is a graph of the measured and simulated transmission between ports 1 and 2 in accordance with an embodiment of the present invention.
Figure 14B:
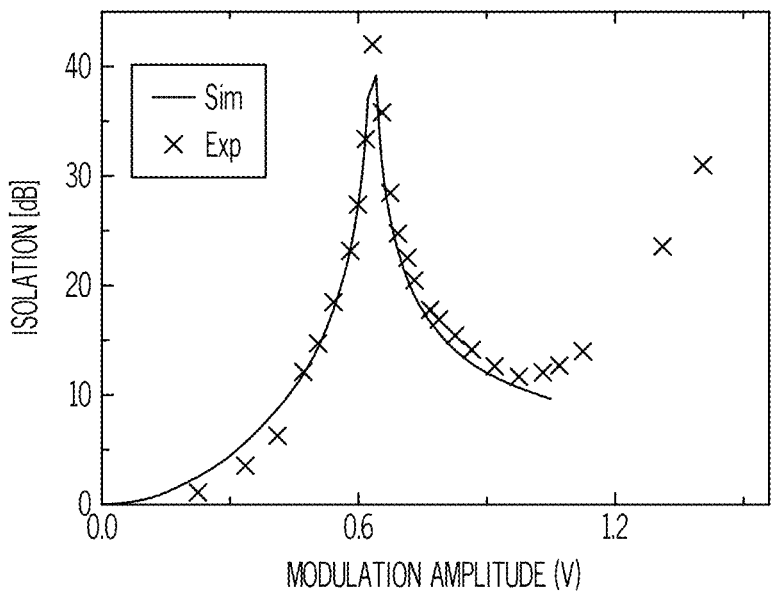
FIG. 14B is a graph of the isolation ($S_{12}/S_{21}$) in a logarithmic scale in accordance with an embodiment of the present invention.

In order to get deeper insights in the effect of $V_m$ on the device operation, FIG. 14A presents the transmission between ports 1 and 2 at resonance versus $V_m$. FIG. 14A is a graph of the measured and simulated transmission between ports 1 and 2 in accordance with an embodiment of the present invention. As illustrated in FIG. 14A, transmission is different for opposite propagation directions, indicating non-reciprocity. For $V_m=0$, $S_{21}=S_{12}$, as expected. Increasing $V_m$ results in a decrease of $S_{21}$ and an increase of $S_{12}$ until $V_m=0.6$ V, where $S_{21}=0$. As mentioned above, this is the point where $\varphi_R=-\varphi_L=-\pi/6$, i.e., where the counter-rotating modes interfere destructively at port 2. Past this point, $S_{21}$ and $S_{12}$ increase and decrease, respectively, as expected when we depart from the destructive interference condition. For very large values of $V_m$, $S_{21}$ and $S_{12}$ tend to zero, since the counter-rotating states move far from each other and, therefore, are weakly excited at $\omega_+$. The magnitude of the asymmetry between $S_{21}$ and $S_{12}$ can be measured from the isolation $S_{12}/S_{21}$ plotted in FIG. 14B in logarithmic scale versus $V_m$. FIG. 14B is a graph of the isolation ($S_{12}/S_{21}$) in a logarithmic scale in accordance with an embodiment of the present invention. As illustrated in FIG. 14B, for the optimum modulation voltage $V_m=0.6$ V, $S_{12}$ is over 4 orders of magnitude larger than $S_{21}$, indicating extremely strong non-reciprocity, above the levels of commercial magnetic-based devices. All the results in FIGS. 14A-14B refer to $V_{dc}=1.99$ V.

Figure 15:
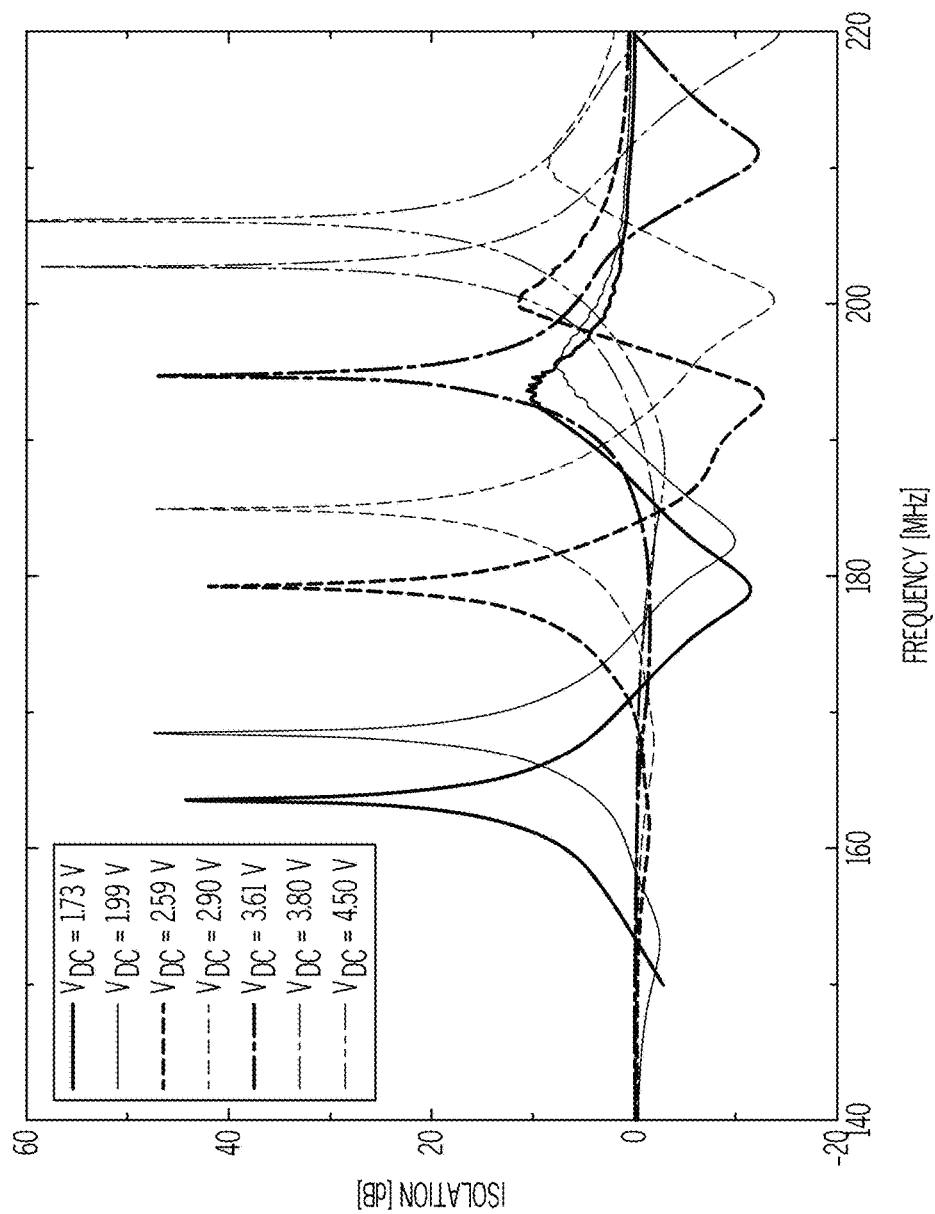
FIG. 15 shows the measured isolation versus frequency for $V_{dc}$ varied between 1.73 V and 4.5 V in a logarithmic scale in accordance with an embodiment of the present invention.

Another key property of this realized device is its unique real-time tunability features. The biasing voltage $V_{dc}$, which provides the necessary reverse biasing condition for the operation of the varactor diodes, determines their static capacitance. Therefore, $V_{dc}$ can be used to actively control the static resonance frequency of the L-C tanks, and consequently the band over which non-reciprocity occurs. FIG. 15 shows the measured isolation versus frequency for $V_{dc}$ varied between 1.73 V and 4.5 V in a logarithmic scale in accordance with an embodiment of the present invention. Referring to FIG. 15, in each case, $V_m$ is appropriately adjusted so that isolation at resonance becomes maximum. It is clear that the non-reciprocal response of the device of the present invention can be efficiently tuned between 150 MHz and 210 MHz, corresponding to a relative bandwidth of over 30%. Across all this range, the measured isolation is above 40 dB, and it even reaches 60 dB for $V_{dc}$=4.5 V. This strong tuning capability is an additional advantage of the device compared to conventional magnetic-based microwave circulators, and it may be exploited in scenarios requiring dynamic tuning to balance changes in temperature or in the environment.

In addition to being an ideal replacement for conventional microwave non-reciprocal components, with significant advantages in terms of size, integration, cost, linearity and noise reduction, the findings presented herein become particularly relevant if translated to integrated nanophotonic technology, for which optical non-reciprocal components may become of crucial importance for laser protection and signal routing. The approach discussed herein is applicable to any frequency of the electromagnetic spectrum, and therefore also to light as discussed further below in connection with FIG. 16. At such frequencies, electro-optic modulation in silicon-based components is typically achieved via carrier injection/depletion. Although such technology can provide quite strong permittivity modulation, it is accompanied by significant loss, and low modulation frequencies for large modulation amplitudes. These side effects impose severe limitations on the applicability of the principle of angular-momentum biasing in its original form based on uniform micro-ring resonators. As previously explained, the strength of angular-momentum-based non-reciprocity is contingent upon the quality factor of the ring resonators and their modulation frequency. Micro-ring resonators exhibit poor modulation efficiency, and, as a result, they require strong modulation. Strong modulation in turn typically degrades the quality factor and limits the modulation frequency, thus also restricting the magnitude of the attainable non-reciprocity. On the other hand, the concept presented here ensures a modulation efficiency of 100%, significantly relaxing the requirements in terms of the modulation amplitude. This in turn allows large quality factors and large modulation frequencies, which directly translate into strong non-reciprocal response in deeply subwavelength devices. Furthermore, the introduced approach can be readily applied to photonic crystal technology, for which efficient high-Q coupled cavities may be easily implemented and efficiently modulated.

Figure 16:
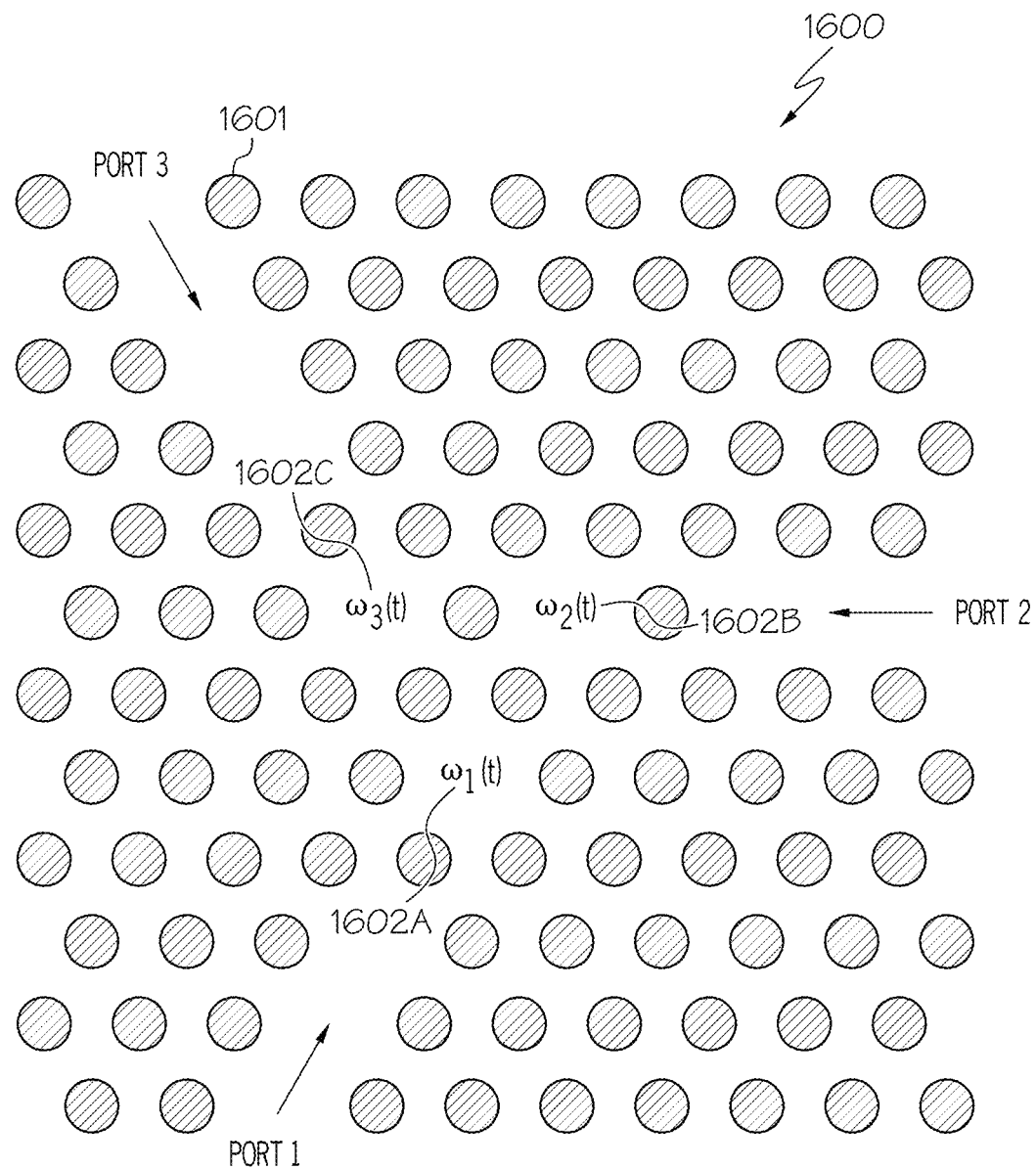
FIG. 16 illustrates a photonic crystal used for building resonators for light in accordance with an embodiment of the present invention.

Referring to FIG. 16, FIG. 16 illustrates a photonic crystal 1600 used for building resonators for light in accordance with an embodiment of the present invention. Photonic crystal 1600 includes an array of dielectric rods 1601, which prevents light propagation in a particular frequency range or photonic bandgap. Photonic crystal 1601 further includes defects or gaps 1602A-1602C, such as three of them as shown in FIG. 6, between these dielectric rods 1601. Light is localized (i.e. light cannot escape) at these gaps 1602A-1602C for frequencies in the photonic bandgap of the array of dielectric rods. In this manner, gaps 1602A-1602C can function as a resonator. Gaps 1602A-1602C can be modulated via electrical or optical means. Gaps 1602A-1602C are also coupled to three external ports through three waveguides formed by removing three series of dielectric rods in the photonic crystal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A non-reciprocal device comprising:
   a ring of one or more electromagnetic resonators coupled together; and
   circuitry tailored to apply an angular momentum in the form of mechanical motion, rotation or spatio-temporal modulation to said one or more electromagnetic resonators to produce non-reciprocity without magnets, wherein said circuitry comprises one or more electrically tunable elements, one or more DC biasing sources or one or more AC modulation sources, wherein said circuitry further comprises one or more filters that minimize interference between said ring and a biasing network.

2. The non-reciprocal device as recited in claim 1, wherein said one or more electromagnetic resonators are formed from dielectric, semiconducting and/or metallic inclusion.

3. The non-reciprocal device as recited in claim 2, wherein said dielectric, semiconducting and/or metallic inclusion comprises silicon and/or gold.

4. The non-reciprocal device as recited in claim 1, wherein said non-reciprocal device has one of the following functionalities: an isolator, a circulator, a non-reciprocal phase shifter, a gyrator and a Faraday rotator.

5. The non-reciprocal device as recited in claim 1, wherein each of said one or more electromagnetic resonators comprises one or more inductors and one or more capacitors configured to determine modulation and radio frequency frequencies.

6. The non-reciprocal device as recited in claim 1, wherein each of said one or more electromagnetic resonators comprises an LC circuit.

7. The non-reciprocal device as recited in claim 1, wherein said one or more electromagnetic resonators are coupled together via capacitances.

8. The non-reciprocal device as recited in claim 1, wherein said circuitry comprises time-varying circuit elements.

9. The non-reciprocal device as recited in claim 8, wherein said time-varying circuit elements are biased by a static voltage providing a reverse bias to actively control a static resonance frequency of said one or more electromagnetic resonators.

10. The non-reciprocal device as recited in claim 8, wherein said time varying circuit elements comprise a switch, wherein said switch is controlled through pulsed signals.

11. The non-reciprocal device as recited in claim 8, wherein said time varying circuit elements comprise a varactor, wherein said varactor is biased by a radio frequency signal providing said spatio-temporal modulation.

12. The non-reciprocal device as recited in claim 8, wherein said time-varying circuit elements comprise one of the following: a varactor, a switch and a transistor.

13. The non-reciprocal device as recited in claim 1 further comprising:

two or more ports connected to said ring for providing access to said ring for radio frequency and modulation signals.

14. The non-reciprocal device as recited in claim 13, wherein said modulation signals are generated by one or more waveform generators.

* * * * *